(12) United States Patent
Sisk

(10) Patent No.: US 9,175,796 B2
(45) Date of Patent: *Nov. 3, 2015

(54) HOPPER TEE WITH COMFORMABLE ARCUATE CLOSURE MEMBER

(71) Applicant: David E. Sisk, Bonne Terre, MO (US)

(72) Inventor: David E. Sisk, Bonne Terre, MO (US)

(73) Assignee: Bulk Tank, Inc., Park Hills, MO (US)

( * ) Notice: Subject to any disclaimer, the term of this patent is extended or adjusted under 35 U.S.C. 154(b) by 394 days.

This patent is subject to a terminal disclaimer.

(21) Appl. No.: 13/815,315

(22) Filed: Feb. 19, 2013

(65) Prior Publication Data
US 2013/0168956 A1    Jul. 4, 2013

Related U.S. Application Data

(60) Continuation-in-part of application No. 13/200,625, filed on Sep. 27, 2011, now abandoned, which is a continuation-in-part of application No. 12/249,672, filed on Oct. 10, 2008, now Pat. No. 8,091,925, application No. 13/815,315, which is a division of application No. 10/298,305, filed on Nov. 18, 2002, now Pat. No. 6,786,362, and a division of application No. 12/249,672, filed on Oct. 10, 2008, now Pat. No.

(Continued)

(51) Int. Cl.
| F16L 41/00 | (2006.01) |
| F16L 41/02 | (2006.01) |
| B65D 90/62 | (2006.01) |
| B65D 88/28 | (2006.01) |

(52) U.S. Cl.
CPC ............... *F16L 41/021* (2013.01); *B65D 88/28* (2013.01); *B65D 90/623* (2013.01)

(58) Field of Classification Search
CPC .......... F16L 41/00; F16L 41/021; F16L 45/00
USPC ............ 285/126.1, 129.1–2, 132.1, 133.11–6
See application file for complete search history.

(56) References Cited

U.S. PATENT DOCUMENTS

| 1,208,049 | A | 12/1916 | Tillman |
| 4,848,396 | A | 7/1989 | Sisk |
| 5,030,037 | A | * | 7/1991 | Sisk ............................ 406/91 |
| 5,360,030 | A | 11/1994 | Sisk |
| 5,387,015 | A | 2/1995 | Sisk |
| D358,202 | S | 5/1995 | Sisk |
| 5,540,465 | A | 7/1996 | Sisk |
| D376,416 | S | 12/1996 | Sisk |
| 5,676,404 | A | 10/1997 | Sisk |
| 5,842,681 | A | 12/1998 | Sisk |
| 5,988,867 | A | 11/1999 | Sisk |
| 6,170,976 | B1 | 1/2001 | Sisk |

(Continued)

*Primary Examiner* — Daniel P Stodola
*Assistant Examiner* — Gwendolyn Driggers
(74) *Attorney, Agent, or Firm* — Paul M. Denk

(57) ABSTRACT

A directional hopper tee has a fluted interior vertical pipe that merges into a horizontal pipe. The horizontal pipe has an inlet that may receive bulk material, and subject to pressurized air that conveys the bulk material through the hopper tee. Bulk material may be discharged from a hopper through the vertical pipe, for conveyance for discharge from the horizontal pipe of the tee. A closure gate or door is provided through the bottom of the tee, generally in alignment with the vertical pipe, to allow for discharge or dropping of the granular material directly downwardly through and from the tee. The arcuate door is hinged on one side, and is locked by a cam lock on the opposite side, when located into closure against the bottom of the tee, but can be forced opened, through its cam mechanism, to provide for opening of the arcuate door and allow a direct downward discharge of the granular bulk material, from any hopper, and through the drop opening of the tee, as required.

5 Claims, 9 Drawing Sheets

Related U.S. Application Data 8,091,925, and a continuation-in-part of application No. 13/506,244, filed on Apr. 6, 2012, now Pat. No. 8,727,306, application No. 13/815,315, which is a division of application No. 29/421,194, filed on Jun. 12, 2012, now Pat. No. Des. 722,140, and a division of application No. 29/395,947, filed on Apr. 26, 2012, now Pat. No. Des. 673,657.

(60) Provisional application No. 61/030,777, filed on Feb. 22, 2008, provisional application No. 61/517,041, filed on Apr. 12, 2011, provisional application No. 61/688,864, filed on May 23, 2012, provisional application No. 61/744,389, filed on Sep. 26, 2012.

(56) References Cited

U.S. PATENT DOCUMENTS

| | | |
|---|---|---|
| 6,309,335 B1 | 10/2001 | Holton |
| 6,374,465 B1 | 4/2002 | Dykstra |
| 6,386,786 B1 | 5/2002 | Perlman et al. |
| 6,435,493 B1 | 8/2002 | Hoover |
| 6,582,160 B2 | 6/2003 | Campbell et al. |
| 6,595,716 B1 | 7/2003 | VanDeVyvere et al. |
| 6,619,182 B2 | 9/2003 | Attee |
| 6,786,362 B2 | 9/2004 | Sisk |
| 6,913,047 B1 | 7/2005 | Kane et al. |
| 6,932,335 B1 | 8/2005 | Dykstra |
| 7,055,440 B2 | 6/2006 | Sisk |
| 7,069,965 B2 | 7/2006 | Pendleton et al. |
| 7,114,408 B2 | 10/2006 | Rentz |
| 7,568,496 B2 | 8/2009 | Kraenzle |
| 8,091,925 B2 | 1/2012 | Sisk |
| D673,657 S | 1/2013 | Sisk |
| 2006/0082138 A1 | 4/2006 | Kraenzle |
| 2006/0163790 A1 | 7/2006 | Xu et al. |
| 2006/0174760 A1 | 8/2006 | Rentz |
| 2010/0271152 A1 | 10/2010 | Sabah et al. |
| 2011/0025048 A1 | 2/2011 | Webster et al. |
| 2012/0125478 A1 | 5/2012 | Clever et al. |

\* cited by examiner

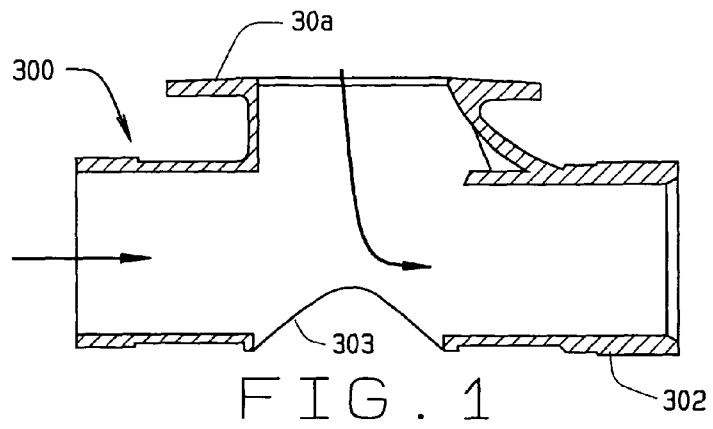
FIG. 1
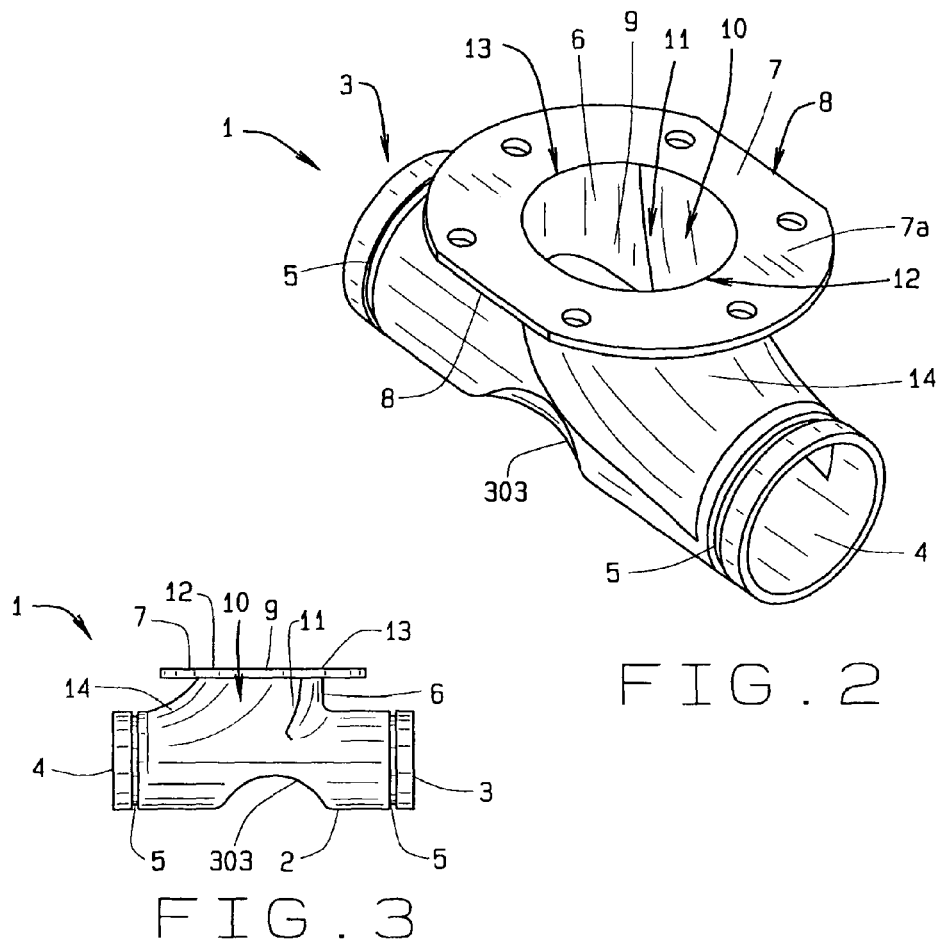
FIG. 2
FIG. 3

HOPPER TEE WITH COMFORMABLE ARCUATE CLOSURE MEMBER

CROSS REFERENCE TO RELATED APPLICATION

This application claims priority to the non-provisional patent application having Ser. No. 13/200,625, filed on Sep. 27, 2011, which claims priority to the non-provisional patent application having Ser. No. 12/249,672, filed on Oct. 10, 2008, now U.S. Pat. No. 8,091,925, which latter application claims priority to the provisional application having Ser. No. 61/030,777, having a filing date of Feb. 22, 2008, which is related to U.S. Pat. No. 6,786,362, which also claims priority to that non-provisional patent application having Ser. No. 12/249,672, filed on Oct. 10, 2008, now U.S. Pat. No. 8,091,925; and this application also claims priority as a continuation-in-part to the application having Ser. No. 13/506,244, filed on Apr. 6, 2012, which claims priority to provisional patent application having Ser. No. 61/517,041, filed on Apr. 12, 2011; this application is also related to Ser. No. 61/744,389, filed on Sep. 26, 2012; which also relates to Ser. No. 29/421,194, filed on Jun. 12, 2012; which also relates to Ser. No. 61/688,864, filed on May 23, 2012; which also claims priority to the above application, and also relates to Ser. No. 29/395,947, filed on Apr. 26, 2012, now U.S. Pat. No. D673,657; all of which applications and patents are owned by a common assignee.

FIELD OF THE INVENTION

This invention relates to an improved means for conveyance of granular material, and more specifically pertains to a tee device that connects to the bottom of a hopper of a tank trailer, or other vehicle, and which incorporates arcuate closure means that reduces the space between the installed tee, and the ground, so as to enhance and increase the amount of clearance provided when the tee is installed and in usage. These types of tees are used for the conveyance of bulk granular material, or to provide an unloading of the same, directly through the bottom of the opening of the tee.

BACKGROUND OF THE INVENTION

This invention relates generally to hopper tees, as used in bulk material handling, and more specifically pertains to a hopper tee which has an arcuate opening through its bottom, to facilitate unloading, but at the same time, incorporates an arcuate closure means that furnishes a cover for the opening and provides uniformity of even the interior dimensions for the formed tee, so as not to encumber the flow of granular material therethrough, when the tee is used for conveying such material to another location.

Hoppers, or tank trailers, regularly transport bulk commodities such as industrial and food products; and even such abrasive materials as sand, or other pelletized materials. When the hopper, or tank trailer, reaches its destination, the bulk commodity is unloaded, typically by a power takeoff driven from the truck mounted blower or a pneumatic system of a plant or factory. The bulk commodity generally unloads from the hopper, into a pipeline, for delivery. Or, the bulk material may pass from the hopper, directly into a tee, and the tee may incorporate an opened bottom, to allow the granular material to discharge directly therefrom. Usually, such hopper tees conventionally have a vertical section of constant dimension, and an integral shape of a horizontal section also of constant dimensions, for forming the inverted tee shaped configuration. To transfer the bulk commodity, the material moves out of the hopper, or bin, or out of the railroad car, by gravity flow or air pressure vibration induced flow, into the vertical section of the hopper tee. The discharge pipe is connected to the horizontal section of the tee. As noted, the prior art hopper tees usually have a complete, one piece assembly that includes a vertical section, including connecting to a hopper, and a horizontal section, connecting to a discharge pipe. The prior art hopper tee designs fit on the bottom of the bins of the pneumatic tank trailers, railroad cars, or the like. Typically, there may be a butterfly valve that connects on the flange of the hopper tee, to the bottom of the bin, which can be opened or closed during discharge. Although, prior art hopper tees function well for their intended purposes, some tees are structured where the granular material being unloaded will impinge upon specific surfaces of the tee, under pressure, or become embedded within parts of the tee itself, which has a tendency to cause abrasion, if not eventual wear through the tees at these active locations of the tee structure. Furthermore, where the butterfly valve is involved, there frequently is caused an impingement and embedding of the granular material within the structural components of the valve, the tee, the conveying line, and all of these can lead towards a contamination of subsequent loads, when another material is shipped by way of the bulk transfer vehicle.

Hoppers, or tank trailers, regularly transport bulk commodities such as industrial and food products. When the hopper, or tank trailer, reaches its destination, the bulk commodity is unloaded, typically by a power take off driven of the tank trailer mounted blower or a pneumatic system of a another source. The bulk commodity generally unloads from the hopper and into a pipeline. To complete the unloading, hopper tees are mounted to the discharge outlet of the hoppers, or bins. The hopper tee conventionally has a vertical section of constant dimension and shape of a similar horizontal section also of constant dimension and shape forming the inverted T shape configuration. To transfer the bulk commodity, the material is moved out of the hopper, or bin, by gravity flow or air pressure vibration into the vertical section of the hopper tee. The clean discharge pipe is connected to the horizontal section of the tee. Pneumatic conveyance of the bulk material through the pipe occurs by establishing a pressure differential in the pipe.

The prior art hopper tee designs fit on the bottom of the bins of pneumatic tank trailers. Typically, the valve of a bin bolts to the flange of the hopper tee. Although prior art hopper tees function well for their intended purposes, some hopper tees lack proper ground clearance for long trailers. Ground clearance has afflicted the tank trailer trucking industry for years. For example, as the hopper tee mounts under the tank, ground clearance problems arise when a long trailer, such as a tank trailer, crosses railroad tracks or other uneven surfaces. The longer the trailer, the easier a hopper tee becomes stuck upon a railroad rail, berm, or other short height surface condition. A stuck trailer delays delivery of product to its destination, risks delay penalties to the trucking company, and increases recovery and repair costs of the tank trailers.

The Department of Transportation (DOT) and state highway departments have established heights, widths and lengths the tank trailers must meet. When the hauler transports light density products, such as plastic pellets, the hauler requires a larger cubic foot capacity, or volume, to haul a maximum payload and make hauling such products economically feasible. To increase the cubic foot capacity and remain within DOT height, width and length standards, the prior art and industry have dropped the bottom of the hopper. However, the bottom of the hopper requires angled walls (due to the angle of repose of the bulk material) that funnel down to the hopper tee to allow for emptying of bulk granular material. For most dry bulk products the angle of repose is approximately 45 degrees to the horizontal to obtain the maximum tank volume, in cubic feet, while remaining within the mandated dimensions.

DESCRIPTION OF THE PRIOR ART

A variety of patents have issued upon various devices to ease the transfer and unloading of bulk granular ingredients from a hopper or bin into a discharge line for delivery to a plant or factory. Prior art hopper tees have a construction of a vertical pipe welding to a horizontal pipe in a generally T shape. These tees remain subject to excessive internal wear by the friction of bulk materials and eventually fail as they wear away. Previously, the Applicant has addressed such wear problems. The U.S. Pat. No. 4,848,396 to Sisk discloses a cast hopper tee designed to provide a smooth and uninterrupted internal transitional surface. That patent also provides for such an improvement in a bottom drop hopper tee.

The U.S. Pat. to Campbell et al., U.S. Pat. No. 6,582,160 provides a hopper tee with a valve. This hopper tee has an inlet that connects to a hopper discharge opening and a perpendicular second hollow pipe section. The inlet has a cylindrical side wall, as in FIGS. 8, 9 and the second hollow pipe section also has a cylindrical cross section as in FIGS. 3, and 10. FIGS. 9 and 10 also show exterior tapering of the inlet and the second hollow pipe section. Unlike the present invention, the Campbell patent shows a straight sidewall at the flange, constrictions of the flow path in the second hollow pipe section as in its FIG. 8, and no arcuate flutes upon the interior of the inlet and second hollow pipe section.

The U.S. published application to Kraenzle, No. 2006/0082138 shows a dual flange tee. One flange 24 goes beneath the perimeter of a valve and the other flange has two wings 14 and 16 that secure below the complete flange 24. Below the wings, the flange tee has a generally cylindrical lower pipe section as in FIG. 2. The lower pipe section has a neck of little, if any, height. The connection between the upper pipe section and the lower pipe section is generally square, as in page 2 col. 21.

The U.S. Pat. No. 5,387,015 to Sisk has a single piece hopper tee with an elliptically shaped opening within the neck. Generally a first pipe with a flange joins perpendicular to an edge of a second pipe that then connects to pipeline tubing. The first pipe also has an elliptically shaped interior space and a pair of wear saddles creating double wall thicknesses at the transition areas between the vertical and horizontal pipes that resists wear by materials sent through the tee. The first pipe has a neck at a square angle to the flange and then the neck flares outwardly upon the entire perimeter. The second pipe has a constant diameter without fluting. This patent lacks the immediate curvature along a portion of the neck, fluting within the second pipe, and single direction of flow as in the present invention.

Then the design patent, U.S. No. D376,416 to Sisk shows the physical appearance and ornamentation of a directional tee. This patent shows a round flange for connection to the hopper discharge and FIGS. 3, and 9 show part of the neck with a square angle to the flange and an opposite portion of the neck attaining a slope slightly below the flange. FIGS. 7 and 10 show slight bulging of the lower pipe below the hopper discharge with the bulging tapering towards the outlet. No interior fluting of the lower, or horizontal pipe, and no immediate curvature of the neck at the flange are shown by this patent.

The U.S. Pat. No. 5,676,404 again to Sisk shows a low profile tee akin to Kraenzle above. Unlike Kraenzle, this patent shows a tee where the diameter of the hollow pipe section increases proximate the opening to the discharge hopper as in FIG. 2. This patent does not show fluting in the hollow pipe section, curvature of the neck at the flange, and single direction use.

The U.S. Pat. No. 5,842,681 also to Sisk describes a pivotal hopper tee. This hopper tee has a mounting frame that connects to the hopper discharge and a camming handle with a hook that swings upon pivot arms. Beneath the mounting frame, the hopper tee has a cylindrical cross section that increases in inside diameter near the valve opening, as in the upper dashed line in FIG. 4.

And then, the U.S. Pat. No. 6,786,362 to Sisk appears related to the '681 patent. This swing away hopper tee has a mounting frame that connects to a tee assembly. The mounting frame provides a flange that extends well beyond the diameter of the hopper tee. The hopper tee geometry is mentioned briefly in this patent but no fluting or diameter changes are shown in its FIGS. 3, 6, and 7. FIG. 7 of the '362 patent shows a hopper tee of constant diameter and its particular lever.

The prior art has various hopper tees with a flat door, large wings extending coplanar with the door, and carriage bolts and wing nuts connecting to the wings. Over time, with rugged usage, and subject to environmental factors, the wing nuts and carriage bolts become hard to open and make the door no longer fit flush with the bottom of the horizontal pipe. The improper fit of the prior art door causes excessive wear to the bottom of the horizontal pipe, shortening its useful life. The prior art shows various hopper tees to resist the abrasion of bulk materials and to provide bottom drop capability. However, the hopper tees remain subject to industry mandated clearance requirements. One clearance requirement remains 15.25 inches between the top of the flange of the hopper tee and the ground surface, and a second clearance requirement is 4.25 inches between the top of the flange of the vertical pipe and the center of a 4 inch inside diameter horizontal pipe of a hopper tee. The 4 inch diameter horizontal pipe connects readily with existing 4 inch diameter plant and factory conveying systems. A third clearance requirement of 5.5 inches from the top of the flange to the center of the inside diameter of a horizontal pipe applies to a 5 inch diameter hopper tee. A hopper tee with high ground clearances remains desirable to the bulk material hauling industry.

SUMMARY OF THE INVENTION

This invention provides a directional hopper tee with an internally fluted vertical pipe blending into a horizontal pipe. The hopper tee has a vertical pipe with an opening that connects to a hopper, or bin, to receive bulk material into the tee and a horizontal pipe centered upon one end of the vertical pipe. The horizontal pipe has an inlet that receives bulk material and pressurized air from ahead of the hopper and an opposite outlet that discharges the bulk material already flowing in the horizontal pipe and that is received from the hopper through the vertical pipe. The vertical pipe has a flange that abuts the hopper and an opening in the flange that matches the opening of a valve on the hopper itself. At the opening, the vertical pipe begins to turn towards the outlet of the lower pipe with a flute. The flute begins immediately at the flange resulting in a vertical pipe with a curved shape towards the outlet and a square shape towards the inlet. The present invention raises the ground clearance of the horizontal pipe by at least one inch resulting in a hopper tee that clears at least 7 inches above the ground. The hopper tee of the invention also unloads up to and including 22% more products per minute than prior art tees during field use conditions. Alternate embodiments of the present invention provide a reinforced flange, a drop tee, and a low profile drop tee. The present invention aids in the unloading of bulk materials from various truck, rail, and ship transporters.

During unloading of bulk materials pass through the invention, the materials contact the tee and its various parts. Such contact induces friction between the materials and the tee along with friction within the materials, which is internal friction. The rise in friction during unloading creates heat, often measured as a rise in temperature of the tee. However, the present invention using its flute lessens the friction between the tee and materials and the internal friction of the materials during the turn from the vertical pipe to the horizontal pipe. The present invention causes a temperature rise in the tee generally 10 degrees F. to 20 degrees F. This is less than prior art tees, or provides an unloading temperature generally 10 degrees F. to 20 degrees F. closer to that of the product temperature. Drivers in the field report unloading hoses being cooler to the touch than before. Limiting the unloading temperature rise becomes important for heat sensitive bulk materials where higher temperatures may cause the bulk materials to melt or to set or to congeal together, such as to become "stringers" of melted plastic pellets, before departing the tank trailer.

Further, independent testing of the device flow capacity has found the invention increases flow by approximately 300 scfm more than prior art tees, or approximately 7300 scfm, see Appendix A. The increased flow results in faster unloading at a delivery site and a quicker turnaround for a tank trailer to deliver its next load. In field tests, drivers reported that surging of product during unloading ceased during usage of the present invention. Surging through the present invention has nearly vanished for usage with HDPE pellets, glass silica sand, soda ash, and flour along with other bulk granular materials. Reduction in product surges leads to less instances of plugged unloading lines and the resultant downtime during an unload cycle.

In a rising or high fuel cost environment, trucking companies, drivers, and their customers seek to minimize costs at any opportunity. The prior art has sought various devices to unload bulk material from a vertical hopper into a horizontal line. Those prior tees have performed satisfactorily, however; the present invention also increases the rate of bulk material unloading. In doing so, the present invention allows a driver to complete an unloading fifteen to twenty three minutes sooner than before. Field tests using 1600 cubic foot trailers in dedicated local runs provided drivers up to twenty minute reductions in unloading times compared to existing tees. Faster unloading leads to more impressed customers, more satisfied drivers, and more loads, or hauls, per day, week or month thus improving revenues to trucking companies.

Further, during unloading of a hopper trailer, the truck remains idling as it provides blower air in some cases. An idling truck often consumes a gallon of diesel fuel per hour. During usage of the invention, unloading raises a truck's engine speed to three times that of ordinary idling, measured in RPM, and consumes three gallons of diesel fuel per hour of unloading. As diesel fuel prices fluctuate in the vicinity of $4 or more per gallon, reducing idling saves trucking companies a significant expense, at least $500 per year during unloading depending on loads per day. The present invention, lowering unloading times noticeably, reduces idling times of trucks, thus leading to fuel cost savings. The present invention increases the operating efficiencies of trucks when measured in miles per gallon or hours per gallon thanks to decreased unloading times. The present invention aids truckers and their companies in using less diesel fuel to accomplish the same unloading job.

It is, therefore, the principal object of this invention is to provide a fluted hopper tee for inducing directional flow that increases the rate of unloading bulk materials from a container by approximately twenty two percent, where the increase in unloading rate varies by the type of bulk granular material unloaded.

Still another object of this fluted hopper tee is to increase the clearance from the lowest extent of the horizontal pipe to the ground surface when the invention is installed.

Still another object of this fluted hopper tee is to meet dimensional and clearance requirements of federal and state agencies along with trucking and material handling industry standards.

Still another object of this drop hopper tee is to provide a bottom drop embodiment of the invention where the door provides a flush fit to the inside surface of the horizontal pipe.

Still another object of this fluted hopper tee is to provide a bottom drop embodiment of the invention where the door prevents leakage of fine particulate matter from the hopper tee.

Still another object of this fluted hopper tee is to provide a bottom drop embodiment of the invention where the gasket and door of the invention can be readily removed for cleaning, such as washing, and when changing between unloading of different materials.

Still another object of this fluted hopper tee is to improve the accessibility of the door and handle of the bottom drop embodiment of the invention, this accessibility includes door attachment ears arranged symmetrically with a symmetrical door and gasket allowing for installation facing either the left or the right side of a trailer.

Still another object of this fluted hopper tee is to improve the accessibility of the door and other moving parts of the bottom drop embodiment of the invention where the gasket can be removed by hand.

Still another object of this fluted hopper tee is to provide a bottom drop embodiment of the invention where the door is opened and later secured by an operator using a single handle, cam lever, or other tool.

Still another object of this fluted hopper tee is to provide a bottom drop embodiment of the invention where the door avoids securement by two or more bolts and retainers that formerly caused misalignment of the door and leakage of bulk materials.

Still another object of this fluted hopper tee is to provide a bottom drop embodiment of the invention where the door opens readily after an extended period of non-usage, such as six months.

Still another object of this hopper tee is to provide a bottom drop embodiment of the invention where the door opens readily, such as upon polymer bushings, with a minimum of lubrication and with reduced risk of load contamination.

A further significant object of this invention is to provide an arcuate opening at the bottom of the tee, to facilitate its unloading, and including an arcuate closure means that conforms to the bottom shape of the tee, and therefore adds additional height to the location of the tee off the surface of the ground, when used with a bulk tank trailer, or even a railroad car.

Another object of this invention is to provide an arcuate closure means that can be held in position, through simple fastening means, in order to attain the benefits of a low profile closure to the under surface of the tee when used.

Still another object of this invention is to provide a tee, with arcuate closure, that internally conforms and mates to the internal dimensions of the longitudinal and horizontal portion of the tee, so that when bulk granular material may be conveyed therethrough, it is not disrupted or obstructed in flow because of the uniformity of internal dimensions of the tee and its closure means.

These and other objects may become more apparent to those skilled in the art upon review of the summary of the invention as provided herein, and upon undertaking a study of the description of its preferred embodiment, in view of the drawings.

BRIEF DESCRIPTION OF THE DRAWINGS

In referring to the drawings:

FIG. 1 shows a longitudinal sectional view of the tee of this invention, showing its vertical section, the horizontal integral section, and a bottom arcuate opening that may be used for unloading of material directly through the tee;

FIG. 2 shows an isometric view of the present invention ready for installation upon a valve and into an unloading line;

FIG. 3 shows a side view of the present invention with the outlet to the left of the figure, and the arcuate opening at the bottom of the tee for direct discharge of bulk material;

DESCRIPTION OF THE PREFERRED EMBODIMENT

Figure 4:
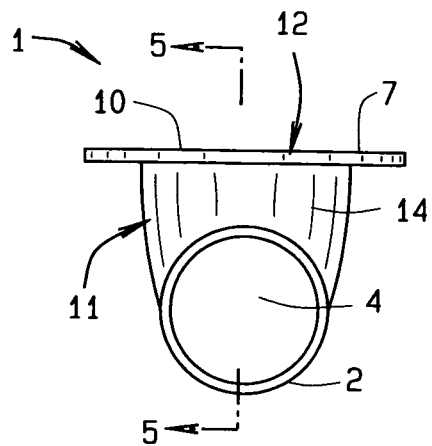
FIG. 4 describes an end view of the present invention through the outlet.

In referring to the drawings, FIG. 1 shows a drop tee, having an arcuate style of bottom, wherein the tee 300 includes a flanged vertical section 301, a horizontal or longitudinal section integrated into the structure of the tee, as noted at 302, and further incorporates that arcuate opening through its bottom, as at 303, that provides for unloading of the hopper bin or tank trailer directly through the shown attached tee 300.

In referring to the drawings, FIG. 2 also shows the integral tee, generally known as a hopper tee, of the present invention 1 in a perspective view. The present invention has a generally transverse hollow pipe, hereinafter horizontal pipe 2, round in cross section and of a known diameter. The horizontal pipe has two opposed ends, one end being an inlet 3 that receives material sent into the hopper tee under pneumatic pressures from another source, and the opposite end being an outlet 4 that discharges material from the inlet and the materials as unloaded from a hopper, or bin, into and through the hopper tee. The inlet and the outlet each have a perimeter slot 5 for coupling the invention 1 onto a pneumatic system for unloading. The coupling slots 5 generally extend around the entire circumference of the lower pipe proximate its inlet and the outlet.

Generally centered upon and perpendicular to the horizontal pipe, the fluted hopper tee 1 has a vertically directed hollow pipe, hereinafter vertical pipe 6. The horizontal pipe 2 is generally transverse, or perpendicular to the vertical pipe. The vertical pipe is also rounded in cross section and of a known diameter. The vertical pipe has a flange 7 at one end away from the horizontal pipe. The flange extends outwardly from the pipe in a planar form that is parallel to the longitudinal axis of the lower pipe. The flange has a top surface 7a and pattern of holes therethrough that mate with bolts present in valves commonly used in the bulk material hauling industry. In this embodiment, the flange has a truncated round shape where the flange has two mutually parallel straight edges 8, also parallel to the longitudinal axis of the lower pipe. Centered upon the flange, the vertical pipe has an opening 9 that matches the inside diameter of the valves applied upon hoppers used in the bulk material industry.

Where the flange adjoins the vertical pipe, generally as the top surface meets the opening 9, like at a lip, the key feature of the invention begins. The invention provides a flute 10, or a rounded groove, to the interior of the vertical pipe that begins at the flange and extends in a curvilinear manner into the horizontal pipe in the direction of the outlet. The flute has an initial width comparable to the diameter of the opening 9, then the width of the flute narrows as it approaches the outlet 4. The path of the flute is generally shown with a flute line 11 that follows a radius of curvature with a center point proximate the outlet 4. As the flute extends from the flange and curves towards the outlet, the flute tapers in its diameter over an area of transition 14 that may appear as a convex shape, or bulge, in later views of the invention. Where the flute intersects with the flange, the vertical pipe has a radius of curvature immediately. The intersection of the flange with the flute defines a fore edge 12 and where the vertical pipe has a typical connection, or square connection, to the flange where an aft edge 13 exists. The fore edge extends for over 120 degrees of arc of the opening 9, centered upon the horizontal pipe. The aft edge occupies the reminder of the perimeter of the opening.

From the side, FIG. 3 shows the present invention and the location and shaping of the flute. The plane of the flange 7 is generally parallel to the centerline of the horizontal pipe 2. Where the vertical pipe adjoins the flange proximate the inlet, the vertical pipe has a generally square or right angle joint to the flange. The square joint typically follows the aft edge 13 and has no downstream radius. Opposite the aft edge, the flange has the fore edge 12 which marks the upper extent of the flute 10. The flute begins at the top surface of the flange and immediately curves as shown in a concave manner towards the outlet 4 through the transition 14. Opposite the transition, the flute line 11 indicates the position and curvature of the flute as it curves from the flange, through the vertical pipe, and then attains the diameter of the horizontal pipe. The flute line indicates the path of the bulk material as it rounds the juncture of the vertically directed hollow pipe and the transverse hollow pipe. The flute provides an internal transition in the fluid like flow of bulk materials from the vertically directed hollow pipe through a substantially ninety degree turn into the transverse hollow pipe. As can also be seen, the arcuate drop chute or opening 303 is provided for a downward discharge of material directly out of the tee, when opened.

As described above, the transition 14 has a bulge like appearance as shown in FIGS. 3 and 4. The flute 10 begins at the flange 7 and extends forward in the direction of the outlet 4 of the lower pipe 2. The flute has an initial width similar to that of the valve opening in a hopper as at the fore edge 12. The flute then narrows in width as it curves upon a radius until it reaches the diameter of the horizontal pipe. Generally, the hopper valve openings exceed the diameter of the horizontal pipe thus the transition 14 starts wide at the flange and tapers to the horizontal pipe 2. The curvature of the transition also affects the bulge like appearance. The edge of the transition as in this figure defines the flute line 11.

Figure 5:
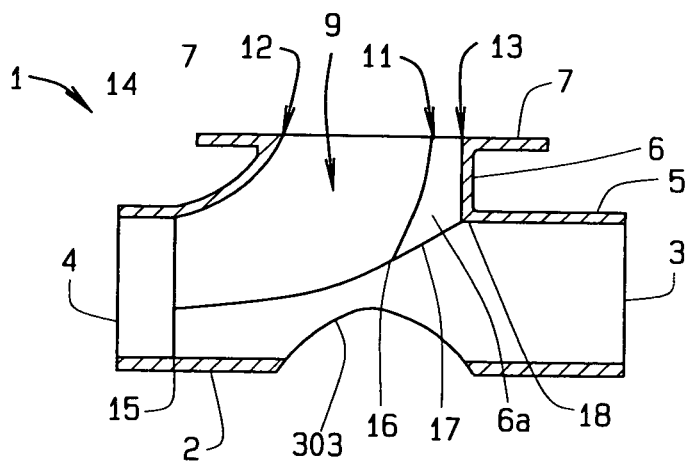
FIG. 5 shows a longitudinal sectional view of the tee.

FIG. 5 shows a sectional view of the invention, lengthwise with the interior exposed, where the key feature operates to accelerate the flow of bulk granular material through the hopper tee. The flange 7 is generally shown horizontal and parallel to the longitudinal axis of the horizontal pipe. The flange has the fore edge 12 at the opening 9 towards the outlet 4 and the opposite aft edge 13 towards the inlet 3, as aforesaid. The aft edge defines a square edge that connects the flange, the vertical pipe, and the horizontal pipe. Then the fore edge begins the flute where the vertical pipe intersects the top surface of the flange. The flute curves in a concave manner from the fore edge, through the transition, and reaches the horizontal pipe behind the coupling slot 5 near the outlet 4. Opposite the fore edge, the flute abuts the aft edge and extends as a curvilinear line 11 from the flange through the vertical pipe and partly into the horizontal pipe. As the flute extends across the diameter of the vertical pipe and partly around the circumference, the flute adjoins the inner wall of the vertical pipe, as at 6a. The drop cute 303 in the bottom of the tee is also seen.

As soon as the bulk material, or product, leaves the tank, hopper, or tank valve, the bulk material enters the uniquely designed flute of this invention. The flute line begins at the top surface of the flange more than half way across the diameter of the opening 9 and descends at a slight curve towards the outlet through the vertical pipe and into the horizontal pipe. Inside the horizontal pipe, at less than half of the diameter of the horizontal pipe the flute line curves more sharply and attains an asymptotic angle to the centerline of the horizontal pipe. The flute line ends at a confluence point, 15, proximate the outlet slightly below the centerline. At the end of the flute line 11, the flute has reached a width identical to that of the inside diameter of the horizontal pipe. Where the flute begins to curve more sharply, an inflection point, as at 16, starts an eddy line 17 that extends to the intersection of the vertical pipe with the horizontal pipe at 18. Above the eddy line 17 within the aft edge 13 and outside the flute line 11, eddies form in the bulk material flowing from the inlet into the horizontal pipe. The present invention creates less eddy currents and turbulence than prior art tees which leads to less friction between the bulk material and the invention and internal friction of the bulk material. The eddies in the material flow ease the merge of bulk material flowing from the opening 9 into the flute 10 and then follow a curved flow path induced by the flute 10. The fewer eddy currents and more laminar like flow of the bulk material generates less friction and less heat imparted to the invention which allows for a longer useful life compared to prior art tees. The bulk material flows into the horizontal pipe from the inlet and starts the bulk material immediately to drop through the opening 9 into a curved flow through the hopper. The bulk material flowing along a curve merges with that flowing along the horizontal pipe much like two watercourses at a confluence become one river.

Bernoulli's principle reminds us that energy is conserved across a straight pipe and through various joints including a hopper tee. Under the Bernoulli equation, the head of the fluidized bulk material entering the fluted hopper tee equals the head of the fluidized bulk material exiting the outlet 4 where head represents the pressure, kinetic, and potential energies. This relationship is shown in the following equation:

$$\frac{p_1}{\gamma} + \frac{v_1^2}{2g} + z_1 + \frac{p_2}{\gamma} + \frac{v_2^2}{2g} + z_2 = \frac{p_3}{\gamma} + \frac{v_3^2}{2g} + z_3$$

Where the bulk material energies at the inlet 1 are added with those of the opening 2 to equal those energies of the outlet 9. The inlet energies and the opening energies create two forces, one force from the tank pressure pushing the bulk material down the tank, and a second force from the line pressure pulling the bulk material down the line beneath the tank or hopper for distribution. The tank pressure is approximately 25 psi while the line pressure is approximately 20 psi. As the potential energy of the bulk material flowing through the opening adds to the kinetic energy of the material from the inlet, the combined material exits the outlet at a greater velocity and thus accelerates unloading of each hopper and an entire trailer of hoppers. Further, in the vicinity of the inner wall 6a of the vertical pipe, the flute causes a venturi, or siphon like, effect that aids in drawing, or pulling, bulk material from the hopper, through the valve, into the opening 9, and thus into the horizontal pipe. Additionally, the bulk material within the flute attains a pressure of approximately 15 psi while the material arriving from the inlet has a pressure of approximately 20 psi. The pressure gradient between the two flows of material augments the siphoning effect of the curved flow and the eddies formed therein.

Figure 6:
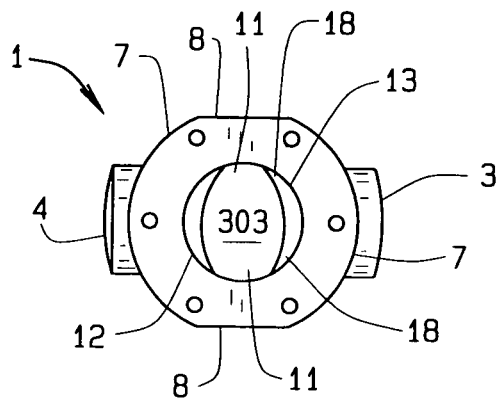
FIG. 6 shows a top view of the tee with the outlet to the left of the figure, and the direct discharge outlet through the bottom of the shown tee.

And then FIG. 6 shows a top view of the present invention looking through the opening 9 in the flange 7 into the hopper tee 1, particularly the horizontal pipe 2. The flange, as before, has a truncated round shape with edges 8 parallel to the length of the horizontal pipe. Within the flange, the opening has the aft edge 13 towards the inlet 3 and extending less than half way around the circumference of the opening. The remainder of the opening has the fore edge 12 that begins the flute 10 that descends through the vertical pipe into the horizontal pipe towards the outlet along the flute lines 11. Or the opening 303 is provided through the bottom of the horizontal pipe. Inwardly and towards the inlet from the flute lines 11, the inner wall 6a extends upwardly from the flute lines to the flange 7 and occupies the remaining circumference of the opening 9 as the aft edge. In this view, the flute lines define a partly parabolic curve with its vertex towards the inlet upon the centerline of the horizontal pipe. The flute lines widen outwardly reaching the inside diameter of the horizontal pipe towards the outlet.

Figure 7:
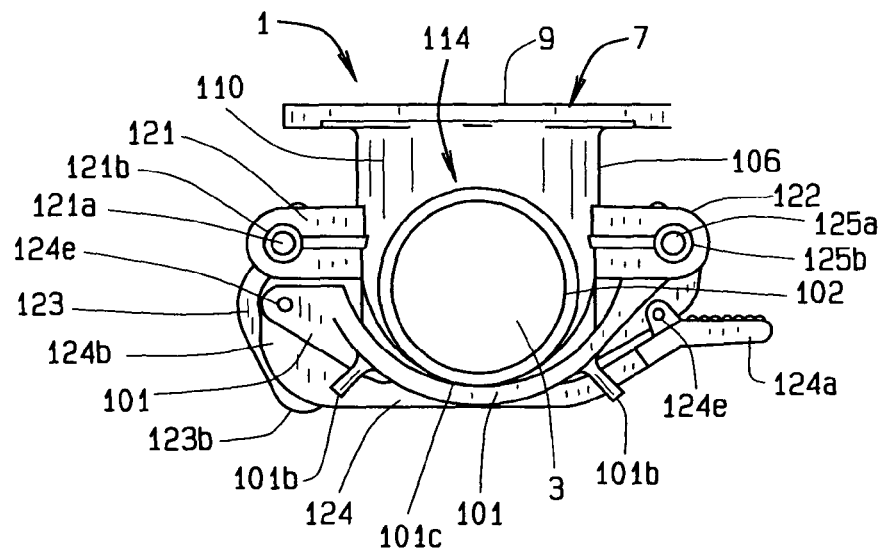
FIG. 7 illustrates an end view of one drop tee embodiment of the present invention.
Figure 13:
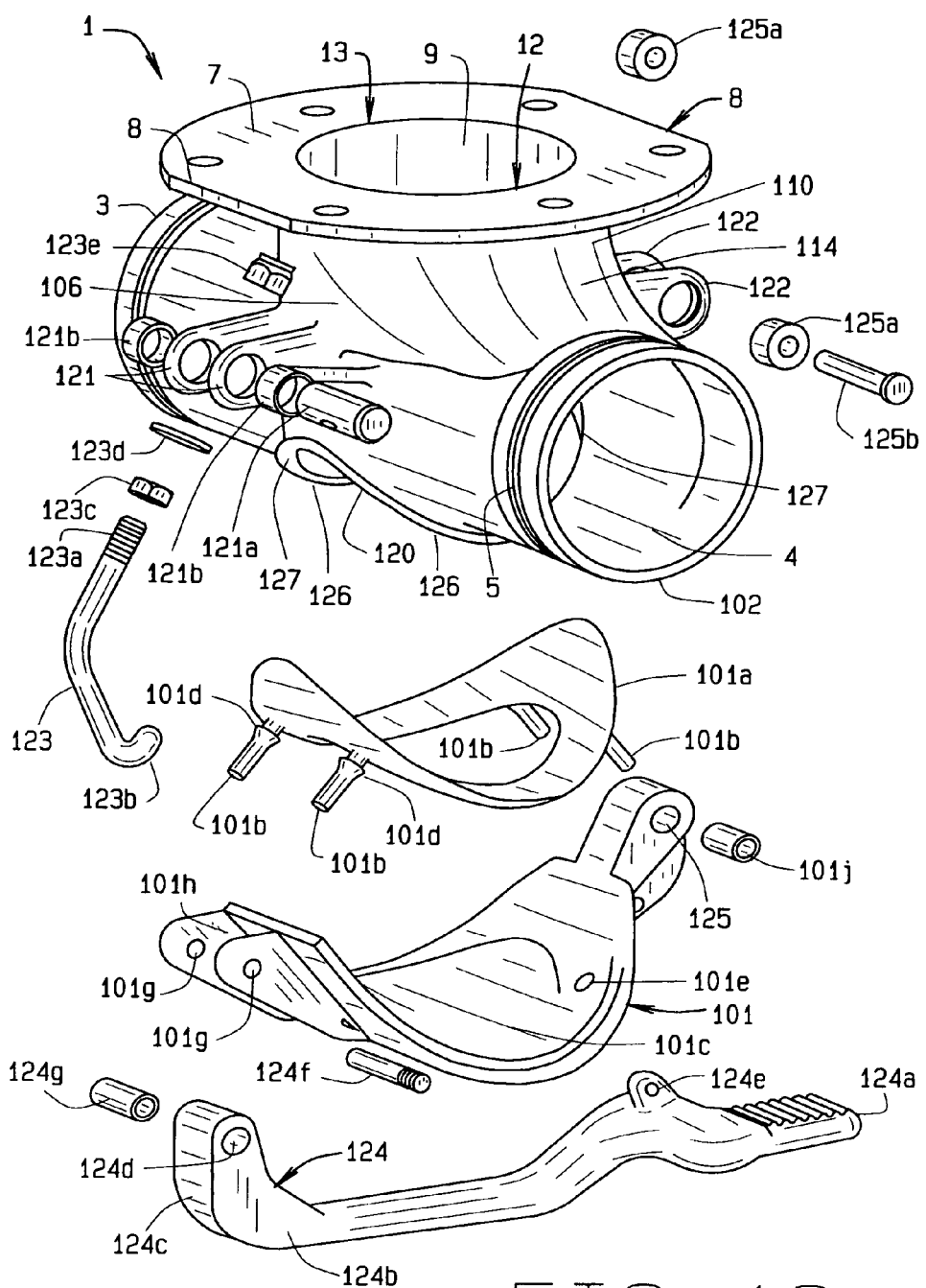
FIG. 13 provides an exploded view of one drop tee.

FIG. 7 then shows a drop tee embodiment of the present invention. This embodiment has an opening as at 9 through the flange that receives bulk material from the hopper or bin. The opening has a known shape and width, round with a diameter in this description. Opposite the opening, this embodiment of the hopper tee has a door 101 that opens below a horizontal pipe 102. As later shown, the door provides a full port opening, or a drop opening or chute 120, later shown in FIG. 10, of the same width and shape as opening 9 for unimpeded discharge of bulk material from the hopper or bin. Beneath the flange, the drop tee embodiment has a vertical pipe 106 that merges with the center of the horizontal pipe 102. In this view, the vertical pipe has a flute 110 that curves from the opening 9 away from the inlet 3 in a transition 114 that contracts in width from that of the opening to that of the diameter of the horizontal pipe. Generally behind the transition towards the outlet, this embodiment has a pair of pivot ears 121 and an opposite pair of hinge ears 122 where each pair is collinear and extending perpendicular to the vertical pipe and to the horizontal pipe. Each member of a pair of pivot ears and hinge ears is coaxial and coplanar with its opposite counterpart. The pivot ears and hinge ears have a symmetric arrangement about the centerline that allows for changing the closure door position to either side of a trailer during usage. The pivot ears extend outwardly from the centerline of the horizontal pipe and provide a pivoting point for a pin 121a within a bushing 121b for a cam bolt 123, wherein the bushing is generally of a polymer. The cam bolt has a threaded end 123a in a bolted connection through the pin and bushing and opposite the threaded end it has a hook 123b. Between the threaded end and the hook, the cam bolt has an off center bend defined by the threaded end approaching the hook or a generally convex shape as shown in the figure. The cam bolt 123 allows a cam lever 124 to pivot downwardly from one end of the door 101 as the door itself pivots beneath the horizontal pipe for opening to drop bulk material. The cam lever has a generally elongated shape with two opposed ends. One end is the pedal 124a that has a foot grip surface to receive a kick from a trucker during opening. A trucker steps on the pedal, or pulls it downward, which allows for easy opening of the door that swings downwardly out and away from the horizontal pipe. With the present invention, the trucker no longer deals with seized wing nuts, rusted bolts, and galled bolts that accumulated in prior art tees in field use. The pedal can also have a slight offset as shown in FIG. 13. On the other end, the pedal has a shoulder 124b generally curved upwardly partially around the door. Near the bottom of the shoulder, it has a groove 124c that receives the hook 123b. Near the top of the shoulder, an aperture 124d admits a pin 124f, through a bushing 124g, that pivotally connects the shoulder and the cam lever to the door 101. The cam lever also includes receives a safety pin, marking strap, or security seal through a second aperture 124e that secures the cam lever upwardly towards the hinge ear 122 to prevent inadvertent opening of the cam lever.

Then the hinge ear 122 extends outwardly from the vertical pipe along the same axis as the pivot ear 121 and provides a door hinge 125 with a bushing 125a and a coaxial pin 125b. The door hinge allows the door to pivot upon one edge opposite the pivot ear 121 and opposite the aperture 124d but above the second aperture 124e of the cam lever from a closed to an open position. The cam bolt 123 has threaded rod like connections that allow for adjustments in positioning of the door upon the horizontal pipe. Here in FIG. 7, the door is shown in the closed position where the door 101 abuts a gasket 101a that compresses upon the lip 126 defining the drop opening 120. The gasket seals the door in a positive seal to the door in one motion without adjusting the door at two places as in the prior art. The gasket can be readily replaced if damaged or worn. The door has at least two, preferably four, holes 101e that admit legs 101b through the door. The legs are generally elongated cylinders, round in cross section, that has a conically shaped bump out, or barb 101d, proximate the main portion of the gasket. The barbs 101d are generally spaced away from the gasket slight less than the door 101 thickness for a snug fit of the gasket to the door. The molded gasket has a generally elliptical shape with an open interior and four legs equally spaced upon the inside face of the gasket. The legs align the gasket upon the door in position for a tight seal. When closed in particular, the door in cooperation with the gasket seals to the horizontal pipe so that the inside surface of the door 101c is flush with the inside diameter of the horizontal pipe. The smooth closure of the door upon the horizontal pipe provides for minimal interruption in the flow of bulk material and lessens the Reynolds number of the bulk material when passing through the horizontal pipe with the door closed. The lower Reynolds number leads to a more laminar like flow of the bulk material through the invention.

Figure 8:
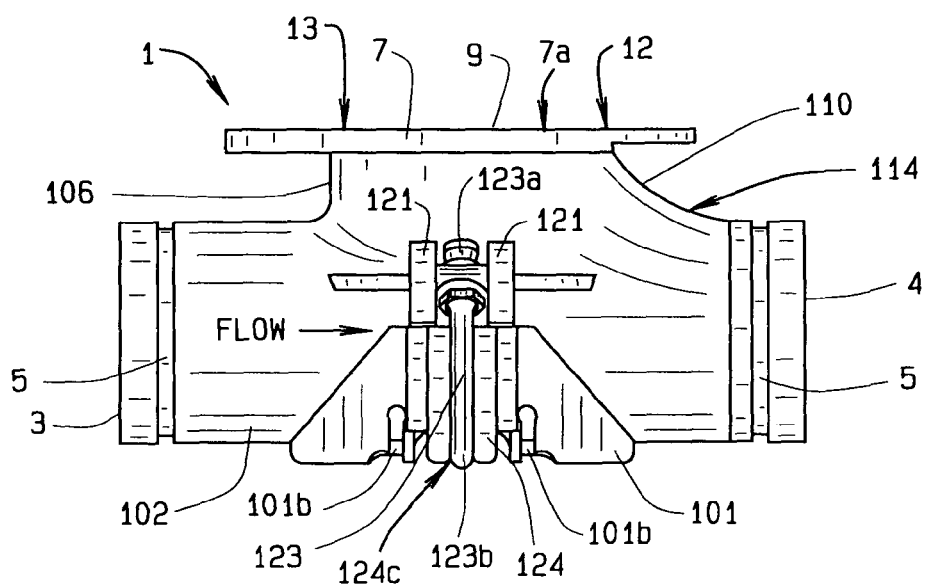
FIG. 8 shows a side view of the drop tee embodiment.

The drop tee embodiment appears from the side in FIG. 8 where a vertical pipe 106 that merges with a horizontal pipe 102. This embodiment has more ground clearance that prior art tees with generally approximately 1½ inches more between the lowest point of the door and the ground. The horizontal pipe has an inlet 3 and an opposite outlet 4 each with a coupling slot 5 as before. The vertical pipe 106 has a flange 7 with an opening 9 that receives bulk material from the hopper or bin above the drop tee. The flange has a top surface 7a that intersects along part of the perimeter of the opening with the vertical pipe defining the aft edge 13. Upon the reminder of the opening 9, the fore edge 12 defines the beginning of the flute 110. The flute curves the vertical pipe forward towards the outlet and begins with a width that of the opening 9 in the flange and then narrows to the diameter of the horizontal pipe. In this embodiment, the flute extends to the immediate vicinity of the coupling slot 5.

Generally centered between the wall 6a of the vertical pipe 106 and the transition 114 of the flute 110, the pair of pivot ears 121 provides two parallel plates to which the cam bolt 123 secures upon the bushing 121b with its internal coaxial pin 121a. The cam bolt has its threaded end 123a passing through a hole in the bushing and the pin secured by two nuts equally spaced about the diameter of the bushing. The cam bolt extends outwardly from the horizontal pipe and bends around the shoulder 124b of the cam lever 124, generally outside of the door. The cam bolt extends downwardly so that its hook 123b engages the groove 124c of the cam lever 124. The cam lever extends beneath and across the door 101 to the opposite side of the drop tee. The door has an inverted saddle like shape that matches the curvature of the horizontal pipe but also rises to allow for a snug fit of the cam lever beneath the door but tight towards the tee. The door seals to the drop opening 120 upon the gasket 101a which compresses upon the lip 126. The lip and the drop opening curve upwardly, as in a saddle, to slightly above the centerline of the horizontal pipe. The perimeter of the door, in this drop embodiment, extends slightly outwardly from the lip causing a reduction in ground clearance below the door of approximately one inch.

Figure 9:
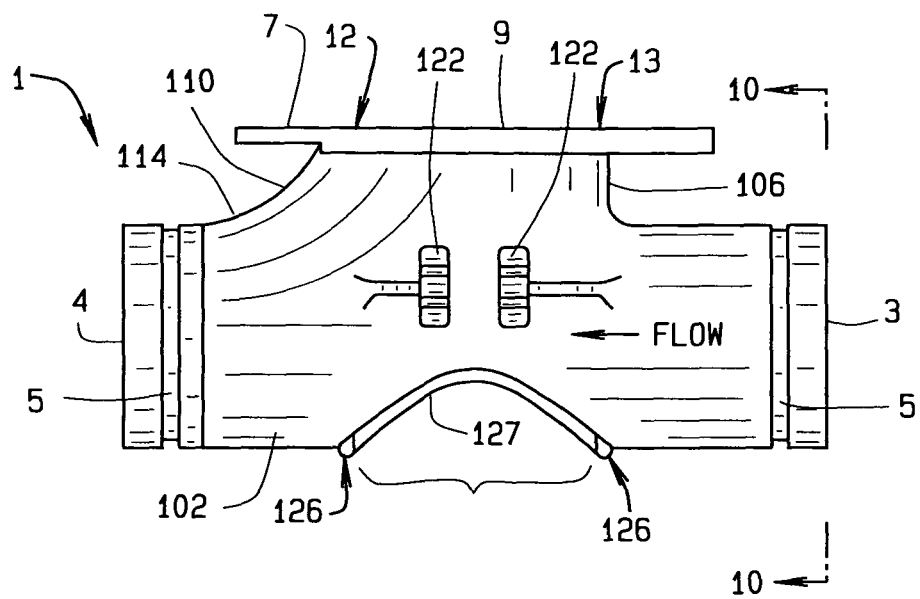
FIG. 9 illustrates a side view of the drop tee without its bottom arcuate door or cover.
Figure 10:
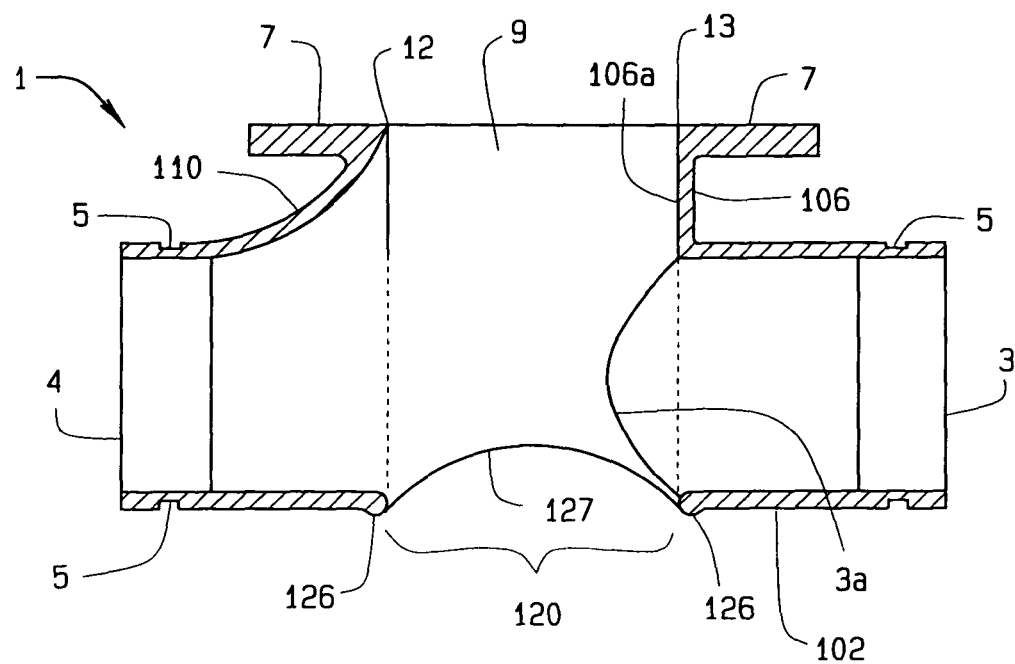
FIG. 10 illustrates a sectional view of the drop tee also without its arcuate bottom cover.

FIG. 9 then shows the drop tee with the door 101, the cam bolt 123, and the cam lever 124 removed. FIG. 10 is a sectional view of FIG. 9. Beneath the hinge ears 122, the drop tee has the drop opening 120 (or 303 as previously described), generally of similar diameter as the opening 9 in the flange 7 as later shown in FIG. 11. In this view, the drop opening is bounded by the lip 126 that has a curvi-linear shape upwardly into the lower pipe until the uppermost tangent to the arc is generally parallel to and slightly below the centerline of the horizontal pipe. Alternatively, the lip has a shape of one of parabolic, elliptic, or arcuate. The lip extends slightly outwardly from the surface of the horizontal pipe and provides a slightly concave surface forming a door bead 127 that accepts the gasket 101a in compression by the door 101 when closed upon the tee. The shape of the lip and the drop opening minimizes the potential disturbance to the inside surface of the horizontal pipe and impediment of bulk material during unloading.

The drop tee in regards to the door and its closure upon the horizontal pipe has a lengthwise sectional view shown in FIG. 10 in the same direction as FIG. 9. This figure illustrates the immediate curvature of the flute 110 at the top surface 7a of the flange 7 that extends just short of the coupling slot 5. Opposite the flute, the vertical pipe has an internal wall 106a generally square to the top surface of the flange and towards the inlet 3. The flange has its opening 9 that abuts the valve of a hopper or bin. The opening has a known diameter, often 5 or 6 inches, and the drop tee locates the drop opening 120 directly opposite the opening 9 in the flange. The drop opening has the same inside diameter as the inside diameter of the opening in the flange and follows the circumference of the horizontal pipe. By providing the drop opening with the same diameter as the opening above, the bulk material falls vertically through the drop tee when the door is opened in a smooth flow without any hindrances. The falling bulk material does not constrict to pass through the door nor do eddy currents arise and nor does turbulence develop. This figure further shows the lip 126 extending outwardly from the surface of the horizontal pipe and having a rounded edge towards the drop opening 120. The horizontal pipe 3 merges with the vertical pipe 106 along the upright curvilinear feature 3a. Alternatively, the feature has a shape of one of parabolic, elliptic, or arcuate.

Figure 11:
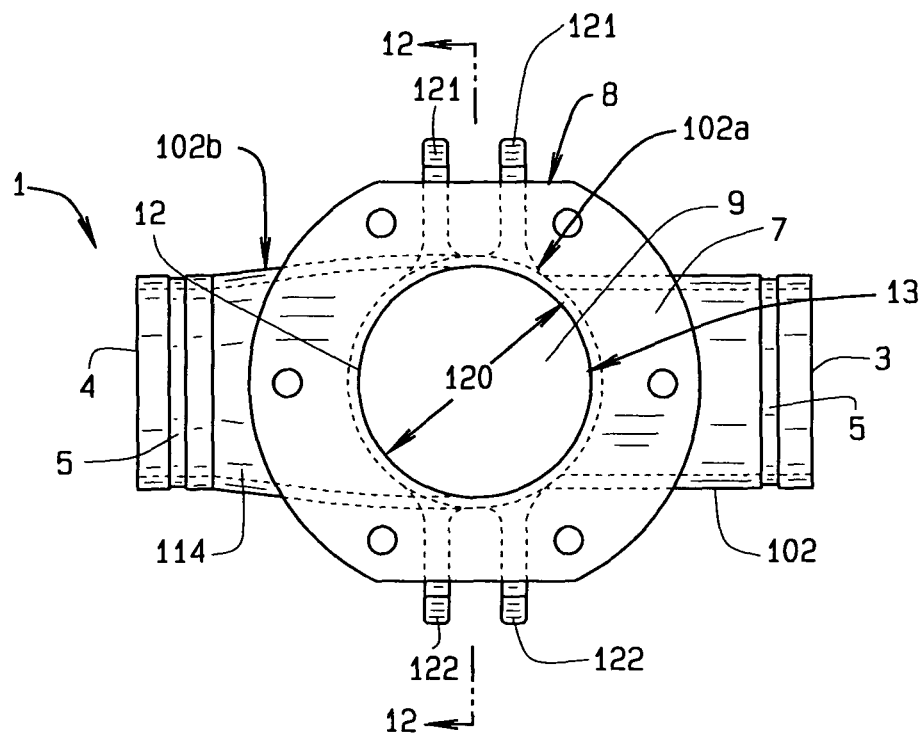
FIG. 11 is a top view of the drop tee.

FIG. 11 then provides a top view of the drop tee with the door, cam lever, cam bolt, and gasket removed. As can be seen, the opening 9 in the flange is concentric with the drop opening 120 (303) located there below and of similar diameter. Bulk material dropping through the opening 9 and the drop opening 120 flows through the drop tee freely when the door is opened. As before, the drop tee has a flange 7 with a pattern of holes thereon for mounting to the valve of a hopper or bin. The flange has a generally round shape but for two parallel edges 8 each also parallel to the centerline of the horizontal pipe. Beneath the edges, the pair of pivot ears 121 and the pair of hinge ears 122 extend mutually opposite and outwardly from the vertical pipe. This view also shows the horizontal pipe widening slightly at its saddle, as at 102a, with the vertical pipe. Then the horizontal pipe attains the diameter of the opening 9 across the junction with the vertical pipe. The horizontal pipe continues itself with the diameter of the opening 9 to for a length slightly less than the radius of the flange as at 102b. Then the horizontal pipe quickly narrows to the diameter proximate the outlet 4. This widened horizontal pipe before the outlet differs from the preferred embodiment where the transition narrows gradually and further behind the outlet.

Figure 12:
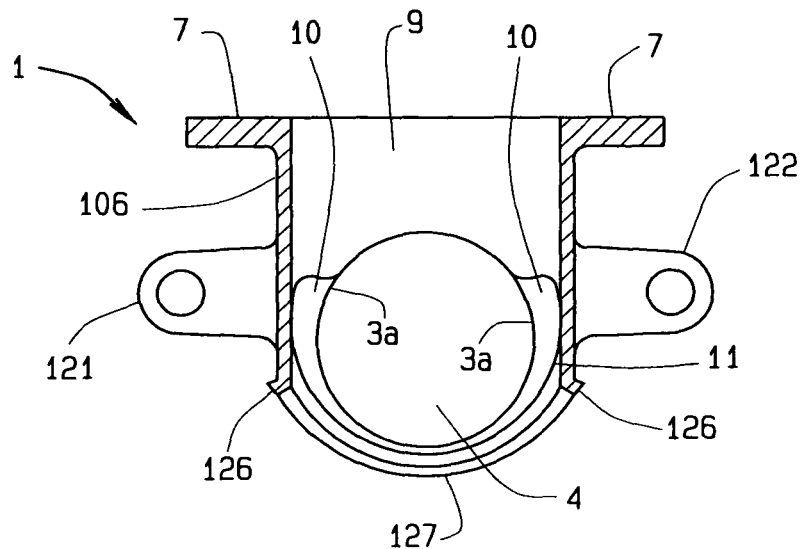
FIG. 12 illustrates a sectional view through the door and hinge accessories of the drop tee.

Turning the drop tee, FIG. 12 shows a sectional view through the center of the pairs of pivot ears 121 and hinges ears 122, looking through outlet 4 towards inlet 3 or upstream, where the door closes upon the gasket that compresses upon the lip 126. The door has a radius of curvature that spans from a lip 126 to the opposite lip across the horizontal pipe. At the location of this section, the lips 126 are spaced apart by the diameter of the opening 9 that exceeds the diameter of the horizontal pipe and the lips are connected by the door bead 127 that in time abuts the gasket. The door radius of curvature and the arcuate length of the door cooperate so that the lowest portion of the door matches the arc at the bottom of the horizontal pipe. The matching of door curvature to the curvature of the horizontal pipe provides a flush and smooth surface to the interior of the drop tee when the door is closed and the tee functions as a hopper tee. Above and behind the door in this figure, the horizontal pipe widens into the flute that begins along the feature line 3a and that briefly widens into the flute 10 and then narrows to the bottom of the horizontal pipe along the flute line 11.

And, FIG. 13 shows an exploded view of the components of the drop tee. This description begins with the bottom of the figure and moves upwardly through the invention. Here, the invention is in the closed position with the cam lever 124 in a generally horizontal orientation but perpendicular to the line of flow through the invention. The cam lever has a foot pedal 124a used by truckers and others to open the invention for discharge of product through the opening 9 in the flange 7 and then the bottom opening 120. Inward from the foot pedal, the cam lever has a second aperture 124e that receives a seal or other marking device. Opposite the foot pedal, the cam lever has its shoulder 124b that has a greater width than the remainder of the cam lever and curves upwardly. The shoulder has a groove 124c generally centered therein that receives the hook 123b of the cam bolt 123 as previously described. The shoulder curves upwardly above the level of the foot pedal and have an aperture 124d therethrough with an axis perpendicular to the length of the cam lever. The aperture receives a cam pin 124f that fits within a coaxial cam bushing 124g. The cam pin provides a pivotal connection of the cam lever to the door 101.

The door has a generally saddle shape with an inside surface 101c having the same radius of curvature as the horizontal pipe 102. The door curves upwardly and towards the cam shoulder in the figure, the door has two spaced apart door ears 101h that extend outwardly from the door. Each door ear has an aperture 101g therethrough that admits the cam bushing 124g. Opposite the door ears, the door has the door tab 101j that has an aperture 101k therethrough that admits a door bushing 101f. The door bushing cooperates with the hinge ears 122 for opening of the door from the remainder of the tee. The door tab extends from the top of the curve of the door generally outwardly from the door and the horizontal pipe when the door is closed. Within the saddle portion of the door, that is down slope from the door ears 101h and the door tab 101j, at least two and preferably four holes 101e extend through the thickness of the door. The door holes 101e admit a part of the molded gasket 101a.

The molded gasket 101a also has a similar saddle shape as the inside face of the door. However, the molded gasket has a large opening therethrough for passage of product. The opening has a diameter of at least that of the opening 9 in the flange. Due to the saddle shape of the gasket, the opening attains a perimeter similar to a section through a spherical body. As described previously, the gasket compresses under closure of the door upon the lip 126 of the horizontal pipe. To prevent the gasket from sliding out of position, the gasket has two, and preferably four, legs 101b that extend radially outward from the gasket in the direction of the door. The legs align and enter the holes 101e which positions the gasket properly upon the door. Each leg has a barb 101d with a generally inverted tapered shape with maximum diameter towards the gasket tapering to the leg diameter away from the gasket. Each barb is also spaced down the leg a distance similar to the depth of the whole 101e. During installation, a worker pushes the leg into the hole until the barb engages and repeats that for each leg. To remove the gasket, the worker pulls on the leg, lengthening it and narrowing it enough for the barb to pass back through the whole 101e. Removing the gasket aids the trucker or other worker in cleaning the door and avoids cross contamination of loads. The removable gasket can be removed and cleaned in contrast to prior art drop doors that remained connected to a tee which hindered cleaning and raised the chance of cross contamination with its risk of rejecting a load.

The door with its installed gasket rotates upon its door bushing 101*j* within the hinge ears 122 of the main portion of the tee. The hinge ears are mutually parallel and spaced apart generally proximate the top of the lower pipe 102. Each hinge ear has its own aperture that admits a hinge ear bushing 125*a* that receives a spring clip pin 125 that passes through the bushing 125 and the door bushing 101*f* and allows the door to pivot or to drop away from the tee, as during unloading. Opposite the hinge ears 122, the tee has the pivot ears 121 where each pivot ear has its own aperture. The apertures of the pivot ears and the hinge ears are spaced symmetrically about the line of flow of the invention to allow for reverse installation of the door if needed in the field. The door of the invention can be installed for right side or left side of trailer usage. Each aperture in a pivot ear receives a pivot bushing 121*b* that in turn admits a cam pin 121 generally centered within the pivot ears. The cam pin has a diametrical hole through its centered that admits the threaded end 123*a* of a cam bolt 123. The threaded end has a jam nut 123*c* and a washer 123*d* inside of the jam nut located outside of the cam pin and a locking nut 123*e* inside of the cam pin. The locking nut secures the cam bolt upon the cam pin for hinge action of the cam bolt 123 to the cam lever 124 as previously described.

Inside of the pivot ears and the hinge ears, the invention has the lower pipe 102 with its outlet 4 to the right in this figure. Inside of the outlet, one can view a portion of the door bead 127 denoting the opening 120 in the bottom of the lower pipe. The outlet has its coupling slot 5 inward of the outlet and the lower pipe has the saddle shaped lip 126 below the hinge ears and the pivot ears. The lower pipe continues rearward to an opposite coupling slot 5 and the inlet 3. The lower pipe merges with the vertical pipe 106 in a generally inverted T position. The lower pipe has a transition section, as at 114, upon its top surface and towards the outlet that defines the outward appearance of the flute 110 locating upon the downstream portion of the tee. The flute commences at the forward inside edge 12 of the flange 7. Opposite the forward edge 12, the flange has an aft edge 13 generally square, or a right angle edge. The flange has two exterior, mutually parallel squared edges 8, generally parallel to the length of the lower pipe 102. And the flange 7 extends perpendicular and outwardly from the vertical pipe 106 with a pattern of holes therethrough for mechanical connection.

Figure 14:
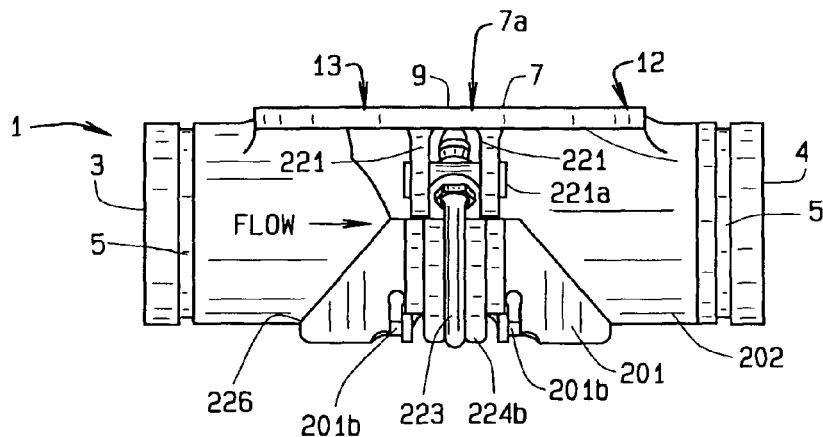
FIG. 14 shows an alternate embodiment of the drop tee having a low profile.

A further alternate embodiment of the invention is shown in FIG. 14 as a low profile drop tee. Similar to FIG. 9, this embodiment of the drop tee has a horizontal pipe 202 with a drop opening 920 as later shown in FIG. 15 that is closed by a door. Opposite the door, this embodiment has a flange 7 with a top surface 7*a* outwardly from the horizontal pipe and the bottom surface 7*b* generally abutting the surface of the horizontal pipe tangentially. This low profile embodiment has more ground clearance that prior art tees with approximately ½ inch more between the lowest point of the door and the ground. The flange has an opening 9 that mate with a valve opening upon a hopper or bin. Upon more than the front half of the opening, the flange has a fore edge 12 that begins a flute that briefly curves in a concave manner from the diameter of the opening 9 to the diameter of the horizontal pipe. This curve begins immediately at the top surface 7*a* and then curves through a vertical distance equivalent to the thickness of the flange to attain a horizontal orientation at the horizontal pipe diameter. Opposite the fore edge, the flange has the aft edge 13 that generally provides a square shape. This embodiment effectively has no vertical pipe and thus a higher ground clearance, approximately 1½ inches higher than the previous embodiments. The fore edge and the aft edge generally have a height limited by the thickness of the flange 7.

Figure 16:
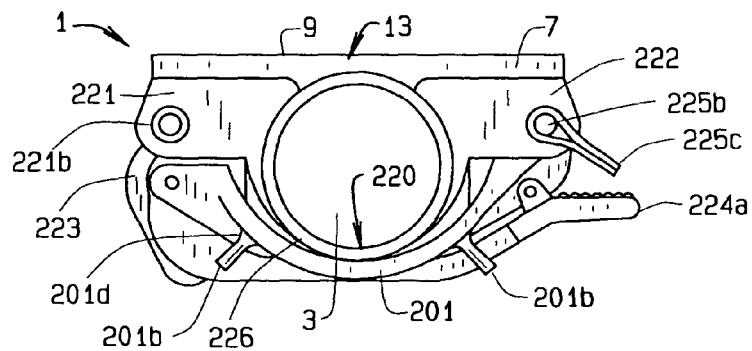
FIG. 16 shows an end view of a low profile drop tee.

Generally behind the transition towards the outlet, this embodiment has a pair of pivot ears 221 and an opposite pair of hinge ears 222 where each pair is collinear and extending perpendicular to the vertical pipe and to the horizontal pipe. Each member of a pair of pivot ears, FIG. 16, and hinge ears, FIG. 16, is coaxial and coplanar with its opposite counterpart. The pivot ears and hinge ears have a symmetric arrangement about the centerline that allows for changing the door position to either side of a trailer during usage. Then the hinge ear 222 extends outwardly from the vertical pipe along the same axis as the pivot ear 221 and provides a door hinge 225 with a bushing 225*a* and a coaxial pin 225*b*. A clevis pin spring retainer 225*c* may be optionally used to secure the pin 225*b* against dislodging from the bushings during rough movement of the invention beneath a trailer. Beneath the spring retainer, the figure shows a cam lever 224 of a generally elongated shape with two opposed ends. One end is the pedal 224*a* may have an offset foot grip surface to receive a kick from a trucker during opening. Unlike the pedals of FIGS. 7, 13, this pedal has a substantial offset, moving the foot pedal to the side and upwardly around the curve of the door which generally contributes to raising the ground clearance of this embodiment of tee.

Here in this figure, the door is in the closed position where the door 201 abuts a gasket 201*a* that compresses upon the lip 226 defining the drop opening 220 as described above. The door has preferably four holes 201*e* that admit legs 201*b* from the gasket through the door. The legs are generally elongated cylinders, round in cross section, that has a conically shaped bump out, or barb 201*d*, proximate the main portion of the gasket. The barbs 201*d* are generally spaced away from the gasket slight less than the door 201 thickness for a snug fit of the gasket to the door. The molded gasket has a generally elliptical shape with an open interior and four legs equally spaced upon the inside face of the gasket. The legs align the gasket upon the door in position for a tight seal. When closed, the door cooperates with the gasket as it seals to the horizontal pipe so that the inside surface of the door 201*c* is flush with the inside diameter of the horizontal pipe. The smooth closure of the door upon the horizontal pipe provides for minimal interruption in the flow of bulk material or change in the Reynolds number through the horizontal pipe with the door closed. The door hinge, shown here as at 222, allows the door to pivot upon one edge opposite the pivot ears 221 and opposite the aperture 224*d* but above the second aperture 224*e* of the cam lever from a closed to an open position.

Figure 17:
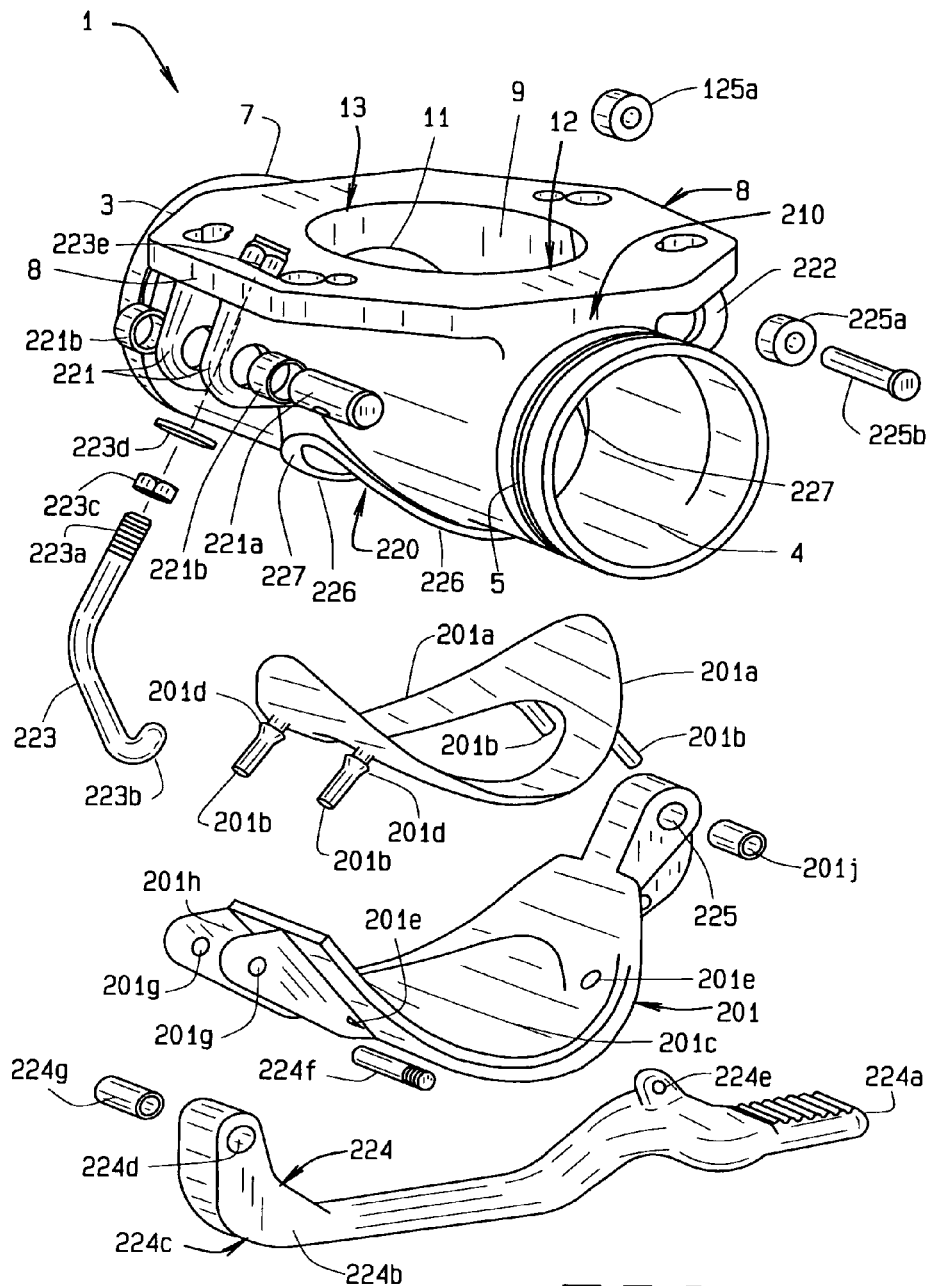
FIG. 17 provides an exploded view of the low profile drop tee.

Turning to FIGS. 14 and 17, opposite the pedal, the other end of the cam lever has a shoulder 224*b* generally curved upwardly partially around the door. Near the bottom of the shoulder, it has a groove 224*c* underneath that receives the hook 223*b*. Near the top of the shoulder, an aperture 224*d* admits a pin 224*f*, through a bushing 224*g*, that pivotally connects the shoulder and the cam lever to the door 201. The cam lever also includes receives a safety pin, marking strap, or security seal through a second aperture 224*e* proximate the pedal 224*a* that secures the cam lever upwardly towards the hinge ear 222 to prevent inadvertent opening of the cam lever.

The drop tee low profile embodiment appears from the side in said FIG. 14 where the flange 7 merges with a horizontal pipe 202. The horizontal pipe has an inlet 3 and an opposite outlet 4 each with a coupling slot 5 as before. The flange 7 has its opening 9 as before that receives bulk material from the hopper or bin above the drop tee. The flange has a top surface 7a that intersects along part of the perimeter of the opening with the vertical pipe defining the aft edge 13. Upon the reminder of the opening 9, the fore edge 12 defines the beginning of the brief flute 210. The flute curves the forward edge of the flange immediately towards the outlet and begins with a width that of the opening 9 in the flange and then narrows to the diameter of the horizontal pipe. In this embodiment, the flute extends in the direction of flow and towards the immediate vicinity of the coupling slot 5.

Generally centered slightly beneath the flange 7 and below straight edges 8, a pair of pivot ears 221 provides two parallel plates to which the cam bolt 223 secures upon the bushing 221b with its internal coaxial pin 221a. The cam bolt has its threaded end 223a passing through a hole in the bushing and the pin secured by two nuts equally spaced about the diameter of the bushing. See also FIG. 17. The cam bolt 223 has threaded rod like connections that allow for adjustments in positioning of the door upon the horizontal pipe. The cam bolt extends outwardly from the horizontal pipe and bends around the shoulder 224b of the cam lever 224, generally outside of the door. The cam bolt extends downwardly so that its hook 223b engages the groove 224c of the cam lever 224. The cam lever extends within the depth of the door 201 to the opposite side of the drop tee. The door, as before, has an inverted saddle shape that matches the curvature of the horizontal pipe but also rises to allow for a recessed fit of the cam lever beneath the door but tight towards the tee. The door seals to the drop opening 220 upon the gasket 201a which compresses upon the lip 226. The lip and the drop opening curve upwardly, as in a saddle, to slightly above the centerline of the horizontal pipe. The perimeter of the door extends slightly outwardly from the lip causing a reduction in ground clearance below the door of approximately one inch.

Figure 15:
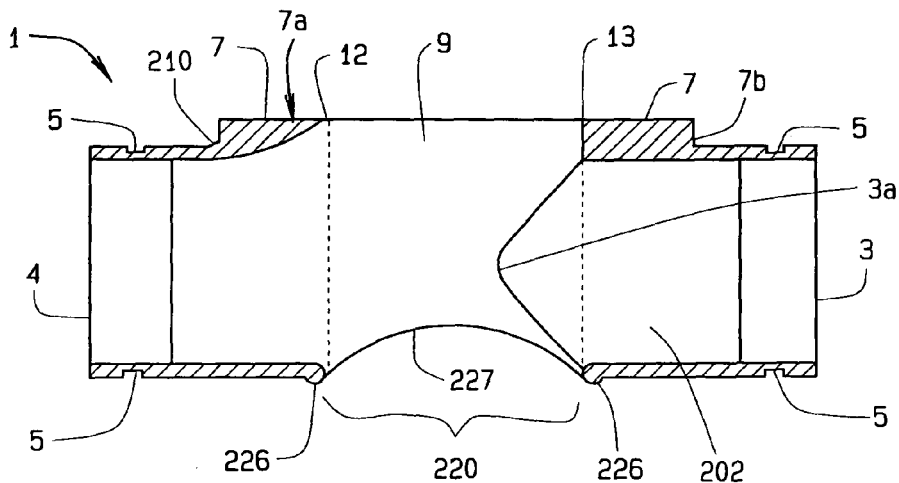
FIG. 15 provides a sectional view of the low profile drop tee.

Similar to FIG. 10, FIG. 15 shows a lengthwise sectional view of the low profile embodiment of the present invention. This embodiment has an opening 9 in the flange and a drop opening 220 located opposite each other that have the same diameter when seen from above. Bulk material passes through the opening, the horizontal pipe, and then the drop opening without any constriction and thus has faster unloading than in previous drop tees. The opening has a fore edge 12 generally located towards the outlet 4. The fore edge has a curve, generally concave, that begins at the top surface 7a and merges quickly with the inside surface of the horizontal pipe generally opposite the door 201. Opposite the fore edge, the opening in the flange has the aft edge 13 that extends perpendicular to the top surface and has no curvature towards the inlet. Then opposite the opening 9, this tee has the drop opening 220 bounded by the lip 226. The lip extends slightly outward from the surface of the horizontal pipe but provides a flush surface with the interior of the horizontal pipe. The lip extends around the opening as the door bead 227. The horizontal pipe 102 at the inlet 3 merges with the flange 7 along the upright curvi-linear feature 3a. Alternatively, the feature has a shape of one of parabolic, elliptic, or arcuate.

And similar to FIG. 7, FIG. 16 illustrates an end view of the low profile embodiment. This embodiment has an opening as at 9 through the flange that receives bulk material from the hopper or bin. The opening has a known shape and width, round with a diameter in this description. Opposite the opening, this embodiment of the hopper tee has a door 201 that opens below a horizontal pipe 202 and has a drop opening 220 of the same width and shape as opening 220 as in the prior figure for unimpeded discharge of bulk material from the hopper or bin. Beneath the flange, the drop tee embodiment has no vertical pipe but does have the pivot ears 221 and the opposite hinge ears 222 both being collinear and extending perpendicular to the flange and to the horizontal pipe. The pivot ears 221 extend perpendicular beneath the flange and outwardly of the horizontal pipe and provide a pivot point for a cam bolt 223. The cam bolt turns upon a pin within bushing locating within apertures in the pivot ears. Then the hinge ears 222, locating opposite the pivot ears in a symmetrically arrangement, allow a cammed handle 224 with a safety pin, or seal wire, removed to pivot downwardly from the horizontal pipe and thus allow the door 201 to open. Then the hinge ears 222 also extend perpendicular and beneath the flange and outwardly from the horizontal pipe and provides a door hinge 225. The door hinge allows the door to pivot upon one end from a closed to an open position. The cam bolt has threaded rod connections, not shown but within the pivot ears, that allow for adjustments in positioning of the door upon the horizontal pipe. The door is shown here in the closed position where it rests upon the lip 226 defining the drop opening 220. The door seals upon a gasket 201, itself upon a raised bead 227, affixed to the lip. More particularly, the door seals to the horizontal pipe so that the inside surface of the door 201a is flush with the inside diameter of the horizontal pipe. The smooth closing of the door upon the horizontal pipe provides for less interruption in the flow of bulk material through the horizontal pipe with the door closed.

And, FIG. 17 shows an exploded view of the low profile version of the drop tee components. This description begins at the bottom of the figure and moves upwardly through the invention. Here, the invention is in the closed position with the cam lever 224 in a generally horizontal orientation but perpendicular to the line of flow through the invention. The cam lever has a foot pedal 224a used by truckers and others to open the invention for discharge of product through the opening 9 in the flange 7 and then the bottom opening 220. The foot pedal may be generally offset in the direction of the outlet 4 thus reducing ground clearance. Inward from the foot pedal, the cam lever has a second aperture 224e that receives a seal, clip, or other marking device. Opposite the foot pedal, the cam lever has its shoulder 224b that has a greater width than the remainder of the cam lever and curves upwardly. The shoulder has a centered groove 224c generally centered therein that receives the hook 223b of the cam bolt 223 as previously described when the door is in the closed position and releases from the hook when the door is in the opened position (not shown). The shoulder curves upwardly above the level of the foot pedal and have an aperture 224d therethrough with an axis perpendicular to the length of the cam lever. The aperture receives a cam pin 224f that fits within a coaxial cam bushing 224g. The cam pin provides a pivotal connection of the cam lever to the door 201.

As before, the door has a generally saddle shape with an inside surface 201c having the same radius of curvature as the horizontal pipe 202. This horizontal pipe generally joins the flange without a vertical pipe as in the prior embodiment. The door curves upwardly and towards the cam shoulder in the figure and the door has two spaced apart door ears 201h that extend outwardly from the door. Each door ear has an aperture 201g therethrough that admits one cam bushing 224g between the door ears. Opposite the door ears, the door has the door tab 201j that has an aperture 201k therethrough that admits one door bushing 201f into the lone door tab. The door bushing cooperates with the hinge ears 222 for opening of the door from the horizontal pipe 202 and the remainder of this low profile tee. The door tab extends from the top of the curve of the door generally outwardly from the door and the horizontal pipe when the door is closed. Within the saddle portion of the door, that is down slope from the door ears 201h and the door tab 201*j*, at least two and preferably four holes 201*e* extend through the thickness of the door. The door holes 201*e* admit a part of the molded gasket 201*a* and are arranged symmetrically.

The molded gasket 201*a* also has a similar saddle shape as the inside face of the door. However, the molded gasket has a large opening therethrough for passage of product. The opening has a diameter of at least that of the opening 9 in the flange. Due to the saddle shape of the gasket, the opening attains a perimeter similar to a section through a spherical body. As described previously, the gasket compresses under closure of the door upon the lip 226 of the horizontal pipe. To keep the gasket in position upon the door and upon the lip when the door is closed, the gasket has two, and preferably four, legs 201*b* that extend radially outward from the gasket in the direction of the door. The gasket has a generally symmetrical shape. The legs align and enter the holes 201*e* which positions the gasket properly upon the door. Each leg has a barb 201*d*, or button head, with a generally inverted tapered shape with maximum diameter towards the gasket tapering to the leg diameter away from the gasket. Each barb is also spaced down the leg a distance similar to the depth of the whole 201*e*. During installation, a worker pushes the leg into the hole until the barb engages and repeats that for each leg. To remove the gasket, the worker pulls on the leg, stretching it while narrowing it enough for the barb to pass back through the hole 201*e*. Removing the gasket aids the trucker or other worker in cleaning the door and avoids cross contamination of loads. The removable gasket can be removed and cleaned in contrast to prior art drop doors that remained connected to a tee which hindered cleaning and raised the chance of cross contamination with its risk of rejecting a load.

The door with its installed gasket rotates upon its door tab 201*j* within the hinge ears 222 of the main portion of the tee. The hinge ears are mutually parallel and spaced apart generally proximate the top of the lower pipe 202. Each hinge ear has its own aperture that admits a hinge ear bushing 225*a* that receives a spring clip pin 225 that passes through the bushing 225*a* and the door bushing 201*f* and allows the door to pivot away or to drop from the tee, as during unloading. Opposite the hinge ears 222, the tee has the pivot ears 221 where each pivot ear has its own aperture. The apertures of the pivot ears and the hinge ears are spaced symmetrically about the line of flow of the invention to allow for reverse installation of the door if needed in the field. The door of the low profile tee can be installed for right side or left side of trailer usage. Each aperture in a pivot ear receives a pivot bushing 221*b* that in turn admits a cam pin 221*a* generally centered within the pivot ears. The cam pin has a diametrical hole through its center that admits the threaded end 223*a* of a cam bolt 223. The threaded end has a jam nut 223*c* and a washer 223*d* inside of the jam nut located outside of the cam pin and a locking nut 223*e* inside of the cam pin. The locking nut secures the cam bolt upon the cam pin for hinge action of the cam bolt 223 to the cam lever 224 as previously described.

Inside of the pivot ears and the hinge ears, the invention has the lower pipe 202 with its outlet 4 to the right in this figure. Inside of the outlet, one can view a portion of the door bead 227 denoting the opening 220 in the bottom of the lower pipe. The outlet has its coupling slot 5 inward of the outlet and the lower pipe has the saddle shaped lip 226 below the hinge ears and the pivot ears. The lower pipe continues rearward to an opposite coupling slot 5 and the inlet 3. The lower pipe effectively has no vertical pipe in this embodiment as it merges with the flange 7. One can see the flute line 11 intersecting with the circumference of the lower pipe slightly below the aft edge 13. The lower pipe 202 in cooperation with the flange 7 at the forward edge 12 has its brief flute 210 locating upon the downstream portion of the tee. The flute begins immediately at the top surface 7*a* of the flange at the forward inside edge 12. Opposite the forward edge 12, the flange has an aft edge 13 generally square, or a right angle edge. The flange has two exterior, mutually parallel squared edges 8, generally parallel to the length of the lower pipe 202. And the flange 7 extends in a plane generally parallel to the direction of flow and to the length of the lower pipe while it has a pattern of holes therethrough for mechanical connection to a valve body or directly to the hopper, or bin.

Figure 18:
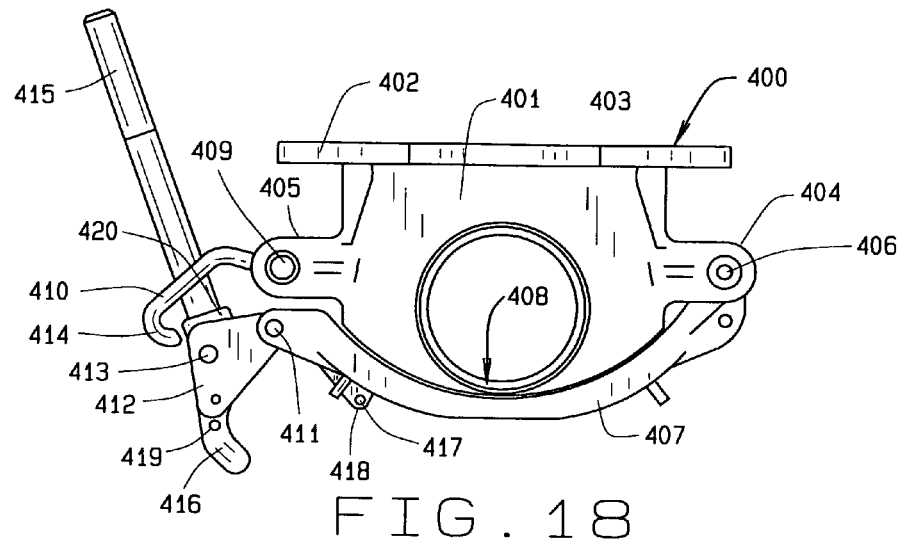
FIG. 18 shows a tool actuated cam means for securing an arcuate cover in place upon a low profile drop tee, with its locking means disengaged as noted.
Figure 19:
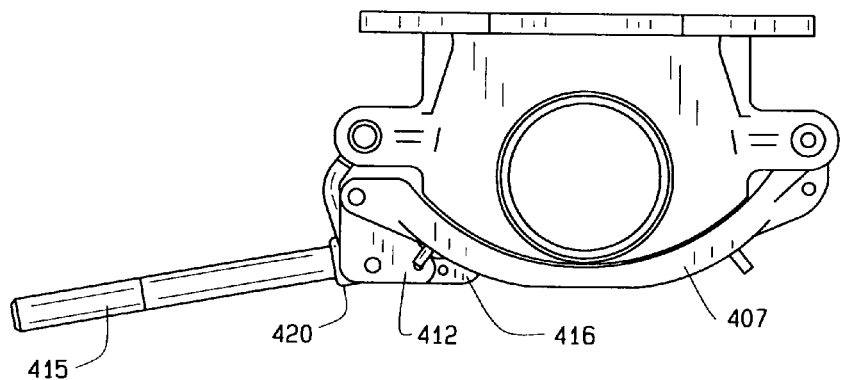
FIG. 19 shows the tool actuated cam locked in place for holding the arcuate cover secured against the bottom of the drop tee to maintain it in closure.

What is identified as the short cam locking means for securing the arcuate cover to the bottom of a shallow drop tee is shown in FIG. 18. As noted therein, the tee 400 includes its shallow vertical portion 401, which integrally forms a flange 402 that secures to the bottom of the hopper for the tank trailer, or other vehicle. The horizontal portion of the tee is noted at 403. A pair of ears are integrally formed on either side of the tee, as noted at 404 and 405; at each of these pair of ears include at least two of these integral extensions, as noted. The ears 404 have a pivot pin 406 connected between them, and provides a secure for pivoting of the arcuate cover 407, so that when the cover is closed, it biases against the open drop outlet, as at 408, and secures it into closure, generally as can be determined from reviewing this FIG. 18. The shape of the cover, with its gasket, biases against the opening and lip of the drop tee, generally as shown and described in FIG. 17. Thus, the cover 407 is capable of pivoting about its mounting pivot pin 406, into opening, as when granular material is discharged from the hopper directly through the tee, or the arcuate cover 7 may be pivoted into a closure position, generally as shown in FIGS. 18 and 19, so as to secure the bottom of the tee into closure, as can be understood.

The opposite side of the tee has its pair of ears 405, and another pivot pin 409 is arranged between them, and mounts for pivoting of a bail or cam bolt 410 similar to the cam bolt as previously described at 223, in FIG. 17. Pivotally connected by means of a pin 411 at the opposite end of the arcuate closure 407 is a cam locking means 412. The cam locking means 412 has sufficient width so as to provide for a pin or other locking surface, as at 413, upon its back surface, as noted, and which pin 413 is provided for engagement by the bail or cam bolt 410, particularly its hooked lower end 414. Thus, when the arcuate closure 407 is located in the position as shown in FIG. 18, and the cam bolt 410 hooks its lower end 414 about the pin or engagement surface 413, on the outer edge of the cam plate 412, the cam plate 412 can be pivoted downwardly, through actuation of any form of rod, tool, crowbar, screwdriver, or other means for obtaining leverage, as noted at 415, and biased counterclockwise into the position as shown in FIG. 19, that furnishes a cam locking engagement of the arcuate gate or door 407, closed into position, as can be noted. Hence, the cam plate 412 will have been pivoted into an off center position, that locks the arcuate gate 407 into a closed position, and secures it in that locking location throughout any storage or transit of the granular material, within the accompanying hopper or tank trailer, as can be understood. Since the cam plate 412 has an extension 416 extending from its front edge, and it comes into alignment with the opening 417 provided upon the arcuate gate 407, a pin or other locking device (not shown) may locate through the aligned openings 418 and 419, to lock the cam plate 412 into its closed and locked position, as shown in FIG. 19.

When this condition prevails, the instrument or tool 415 can be removed from its cam sleeve 420, since the tee is now maintained in closure, its drop opening is closed, its arcuate closure member 407 is locked in position, and ready for transit or storage of the granular material within its accompanying hopper or tank trailer, to which this tee 400, and its arcuate closure means 407, secures.

The benefit of this current invention is that there are only two positions for the arcuate gate 407 to undertake, initially by hinging to the ears 404, as explained, on one side of the tee, and engagement for locking into position by means of its caming device, generally as described through the manipulation of its cam plate 412, and its engagement or disengagement with the cam bolt 410, as explained.

In the various embodiments described above, each has a horizontal pipe as called a transverse hollow pipe. In the various embodiments with a vertical pipe, it is also called a vertically directed hollow pipe. And the low profile embodiments exclude a vertical pipe and generally merge the transverse hollow pipe directly to the flange. In the various embodiments, the integral tee has a flute, that is a rounded groove, that provides an internal transition in the flow of bulk material through a substantially ninety degree turn. The flute rounds the flow of bulk material where the vertically directed hollow pipe or the flange merges with the transverse hollow pipe. Or, when required, the gate 407 may be opened and the bulk material may drop directly out of the tee opening 408, 303, etc.

The fluted hopper tee and its various components may be manufactured from many materials, including but not limited to, steel, aluminum, polymers, ferrous and non-ferrous metals, their alloys, polymers, high density polyethylene, polypropylene, silicone, nylon, rubber, ceramics, and composites. The door gasket is preferably made from rubber, silicone, nitrile, EPDM, or fluorocarbon, suitable for contact with food ingredients and of sufficient durometer to withstand increased air flow and pressures. The various bushings in the embodiments of this invention are generally polymer for inserting pins and for maintaining cleanliness. The horizontal pipe, vertical pipe, and flange may also have a zinc surface treatment that resists road grime, salts, other environmental conditions, heat, and abrasion more than existing tees. The tees also have a heat treated steel alloy that accelerates the unloading process unlike some existing tees where the prior alloy components contribute to slowing the unloading process. The heat treated steel alloy also resists abrasion more than prior art tees. Field tests report that the present invention lasts through approximately 98 loads of silica sand while prior steel tees wear away in approximately 80 loads of the same bulk material. The longer life of the present invention leads to a reduction in repair parts expenses and an increase in the time between replacements of tees due to wear from abrasive bulk materials. The metallic parts of the invention can be made of aluminum which lowers the weight of the bottom drop embodiment by seven pounds, or 40%, from existing aluminum drop tees.

Variations or modifications to the subject matter of this development may occur to those skilled in the art upon review of the invention and its various embodiments as described herein. Such variations, if within the spirit of this development, are intended to be encompassed within the scope of the invention as explained. The description of the preferred embodiment, and as shown in the drawings, are set forth for illustrative purposes only to show the principles of this fluted hopper tee and its various embodiments.

I claim:

1. An integral tee directing the flow of bulk material from a container, located above a horizontal surface of ground, into a horizontal unloading system using pressurized air or gravity, said tee providing for the alternative vertical discharge of the bulk material from a container, the horizontal unloading system having an upstream and an opposite downstream flow of bulk material therefrom, said integral tee increasing a rate of unloading the bulk material from the container and having a ground clearance, comprising:

a flange, generally planer, having a top surface, and an opening through said flange, said opening communicating with said container for passage of bulk material through said integral tee;

a vertically directed hollow pipe extending from said flange and centered upon said opening;

a transverse hollow pipe joining to said vertically directed hollow pipe at a juncture opposite said flange, generally parallel to said flange, said transverse hollow pipe including an inlet adapted to receive bulk material from upstream in the horizontal unloading system, an opposite outlet adapted to discharge bulk material downstream from said integral tee into the horizontal unloading system, and said transverse hollow pipe having a diameter;

said transverse hollow pipe having a drop opening therein generally opposite said flange and corresponding in width approximate to the diameter of the opening in said flange;

a door closing upon said tee drop opening and sealing said drop opening when said door is closed, said door having an interior surface, said interior surface attaining an approximate flush position with the interior of said transverse hollow pipe wherein the bulk material flows smoothly over said door to prevent leakage of bulk material from said integral tee when discharged through said transverse hollow pipe;

said door being arcuate, to conform to the drop opening of said tee, said door including at least one hinge means, proximate one end of said door, and said hinge attaching to the approximate edge of said door on one side, and said hinge attached to said tee, to provide for a pivotal opening of said door with respect to said tee to allow for a vertical discharge of bulk material from said container and through said drop opening of said tee;

a cam lock pivotally attaching to the opposite edge of said door, and including a bail for pivotal engagement with the opposite side of said tee wherein when said cam lock is engaged through its bail with said tee, and the cam lock pivoted, providing for a locked closure of the arcuate door against the bottom opening of said tee during usage;

wherein said transverse hollow pipe having at least one ear extending approximately diagonally and integrally from each of its sides, said at least one integral ear on one side engaging said arcuate door through the hinge means to the tee, the opposite edge of said door engaging through said bail with the at least one ear extending from the opposite side of said tee, said cam lock capable of locking said arcuate door into a closed position, and said cam lock capable of being opened, to release said bail from the cam lock, to provide for opening of said arcuate door;

wherein said bail is a U shaped bail, pivotally connecting with the at least one integral ear on one side of said tee, and capable of connecting to the proximate edge of said door, and locking upon said cam lock when the arcuate door is locked into closure through the pivotal manipulation of said cam lock; and wherein a lip integrally extends around the drop opening provided through the transverse horizontal hollow pipe of said tee, said lip extending integrally from the transverse hollow pipe around its bottom opening, said arcuate door having an internal curved surface with a radius of curvature which is the same as a radius of curvature as said transverse hollow pipe, said curved surface of the arcuate door having a gasket applied thereto, which when the arcuate door is closed upon the tee drop opening, providing sealed closure for the transverse hollow pipe to prevent the vertical discharge of any bulk material therethrough from the container.

2. The flow directing integral tee of claim 1 wherein said vertically directed hollow pipe having an internally located flute therein curving immediately from said opening in said flange towards said outlet, said flute forming a transition between said flange, said vertically directed hollow pipe, and said transverse hollow pipe, said flute having a width equal to a diameter of said flange opening and narrowing to a width equal to the diameter of said transverse hollow pipe, said flute rounding the juncture of said vertically directed hollow pipe and said transverse hollow pipe, and said transition having a generally internal convexed shape;

said flute having a flute line extending from said top surface of said flange through said vertically directed hollow pipe then curving into said transverse hollow pipe, said flute accelerating and turning the flow of bulk materials towards the outlet of said transverse hollow pipe;

said vertically directed hollow pipe at said juncture having a generally curved shape towards said outlet and a generally square shape towards said inlet, said curved shape rounding the juncture of said vertically directed hollow pipe and said transverse hollow pipe; and whereby the flow of granular material through the tee is accelerated thereby increasing the rate of unloading of the bulk material from the container.

3. The flow directing integral tee of claim 2 wherein during usage the ground clearance is at least seven inches.

4. The flow directing integral tee of claim 1 wherein said arcuate door capable of being reversed in its locating upon the bottom of said tee, with the hinge means being engaging with the first said extending ear, and the cam lock engaging with the at least one ear extending from the opposite side during installation and usage.

5. The flow integral tee of claim directing 4 wherein each said at least one extending ear comprises a pair of extending ears, extending approximately diametrically from each side of the said tee, with the hinge means located between the pair of ears on one side of the tee, and the cam locking bail pivotally connecting to the said pair of ears extending from the opposite side of said tee.

* * * * *